US006435677B1

(12) United States Patent
Koitabashi et al.

(10) Patent No.: US 6,435,677 B1
(45) Date of Patent: Aug. 20, 2002

(54) INK-JET PRINTING APPARATUS AND INK-JET PRINTING PROCESS USING THE SAME

(75) Inventors: Noribumi Koitabashi, Yokohama; Hitoshi Tsuboi, Tokyo, both of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/599,953

(22) Filed: Jun. 23, 2000

(30) Foreign Application Priority Data

Jun. 25, 1999 (JP) ............................................ 11-180850

(51) Int. Cl.$^7$ .................................................. B41J 2/17
(52) U.S. Cl. ............................................ 347/96; 347/100
(58) Field of Search .............................. 347/96, 98, 95, 347/100, 101; 106/31–58

(56) References Cited

U.S. PATENT DOCUMENTS

| 5,618,338 A | * | 4/1997 | Kurabayashi et al. ...... 106/26 R |
| 5,938,827 A | * | 8/1999 | Breton et al. ............. 106/31.43 |
| 5,976,233 A |   | 11/1999 | Osumi et al. ............. 106/31.86 |
| 5,997,623 A |   | 12/1999 | Lin ......................... 106/31.58 |
| 6,036,759 A |   | 3/2000 | Wickramanayake et al. ........................ 106/31.28 |
| 6,074,052 A |   | 6/2000 | Inui et al. ..................... 347/101 |
| 6,143,807 A |   | 11/2000 | Lin et al. ...................... 523/161 |

FOREIGN PATENT DOCUMENTS

| EP | 0 726 158 A1 | * | 8/1996 | .............. B41J/2/21 |
| EP | 0 761 783 A2 |   | 3/1997 | |
| EP | 0 791 473 A2 |   | 8/1997 | |
| WO | WO-96/18696 A1 | * | 6/1996 | ........... C09D/11/02 |

* cited by examiner

Primary Examiner—John Barlow
Assistant Examiner—Manish S. Shah
(74) Attorney, Agent, or Firm—Fitzpatrick, Cella, Harper & Scinto

(57) ABSTRACT

A process for carrying out printing using a dye-based ink, a pigment-based ink and a treatment liquid for making these inks insoluble. The process employs two inks of a pigment-based ink $I_p$ and an dye-based ink $I_d$ and includes the steps of applying the pigment-based ink $I_p$ to a printing medium P, applying the dye-based ink $I_d$ so as to overlap the pigment-based ink, mixing them on the printing medium P, and then further applying the treatment liquid S for making these inks insoluble. Alternatively, the process employs an ink $I_m$ containing a pigment and a dye mixed therein which requires no dispersant and includes the step of applying this mixed ink $I_m$ to a printing medium P followed by applying a treatment liquid S for making the ink $I_m$ insoluble. Consequently, high quality printing can be achieved.

63 Claims, 9 Drawing Sheets

FIG. 1
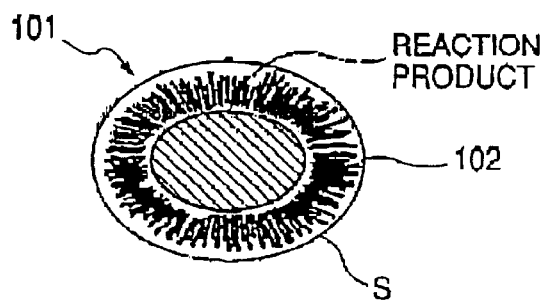
FIG. 2A  FIG. 2B  FIG. 2C
 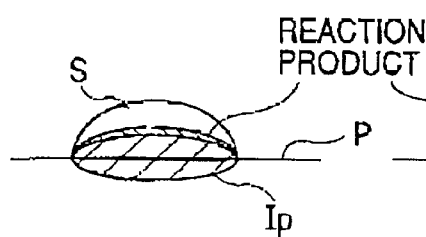 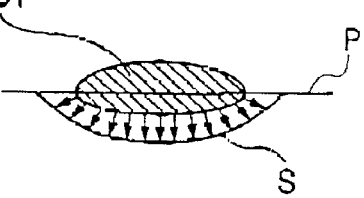
FIG. 3A  FIG. 3B
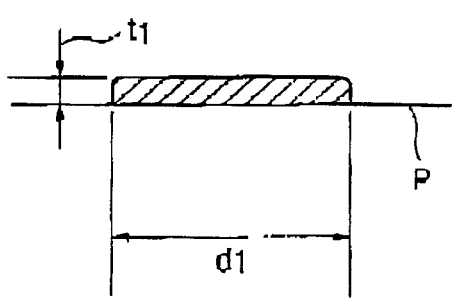 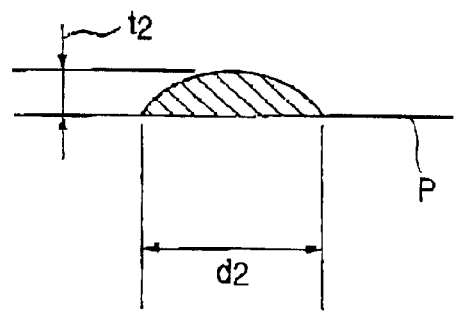

INK-JET PRINTING APPARATUS AND INK-JET PRINTING PROCESS USING THE SAME

BACKGROUND OF THE INVENTION

1. Field of the Invention

The present invention relates to an ink-jet printing apparatus and an ink-jet printing method using the apparatus; more specifically, the invention relates to an ink-jet printing apparatus and an ink-jet printing method for carrying out printing of characters, images, or the like on a printing medium such as printing paper, OHP paper using an ink and a liquid which makes a coloring material in the ink insoluble (hereafter called a treatment liquid).

2. Related Background Art

The ink-jet printing method has various advantages such as low noise, a low running cost, capability of high speed printing, easiness of miniaturization of an apparatus, and easiness of colorization and is widely employed for printers, copying machines, or the like. For the printers, an ink to be employed is selected generally in consideration of the printing properties such as ejecting properties and fixing properties and printing qualities such as the bleeding of printed images, optical reflection density, and coloring ability. It is well known that inks can be divided into two types; a dye-based ink and a pigment-based ink; based on the coloring materials contained in inks. Of these, the pigment-based ink is superior in water resistance and light resistance to the dye-based ink and also has advantageous properties such as capability of clear character quality. On the other hand, as compared with the dye-based ink, the pigment-based ink takes time to be fixed on a printing medium and sometimes the abrasion resistance of obtained images after fixing is not sufficient, and depending on the ink ejected out of a nozzle by one ejecting operation, the size of ink dots formed on a printing medium tends to be small. That is, a pigment contained in a pigment-based ink is generally stably dispersed in the ink by mainly utilizing the electric repulsion force of is a polymer dispersant to cancel the intermolecular force which causes agglomeration of the pigment particles. A polymer dispersant is, therefore, necessary to be added to the ink corresponding to the amount of the pigment. In the case where such a pigment-based ink is employed for printing characters on plain paper by ink-jet recording process, owing to the penetration of the solvent, e.g. water, of the ink into the paper and evaporation of the solvent to ambient air, the pigment particles are agglomerated. At that time, the more the quantity of a polymer dispersant is added, the higher the agglomeration force of the ink on paper is heightened. Thus, the diameter of ink dots formed on a printing medium by a prescribed volume of an ink ejected out of an ink-jet head becomes small and the dot shape Is left approximately in a deformed shape formed at the time of impacting on the paper. Therefore, in order to obtain sufficient recording density to form images and ink dots with a dot diameter sufficient for recording without white stripes or the like, the ejection volume of an ink from an ink jet head is necessarily adjusted to be high. Even if such adjustment is carried out, jointly with the deterioration of the penetration property in paper attributed to the strong agglomeration force of pigment particles on which a polymer dispersant is adsorbed, fixation of an ink on a printing medium is delayed or the abrasion resistance of the recorded images is sometimes decreased.

In order to enlarge the dot diameter and improve the fixing property, it is considered to add a penetrant to an ink for the purpose of improvement of penetration properties of the ink In a printing medium. However, that is sometimes accompanied with undesirable phenomena such as deterioration of the dot shape (deterioration of the peripheral shapes of dots, so called feathering), penetration of the ink to the back side of paper (so called back-through) for the purpose of high quality recorded images. Further, since a coloring material penetrates into the inside of a printing medium, the optical density (OD) of ink dots is not so much increased even though the dot diameter becomes relatively large.

Furthermore, an ink containing a self-dispersing pigment has been proposed, and presumably because of weak agglomeration force of the pigment on paper as compared with that of the above described pigment dispersed in an ink by a dispersant, the ink can provide dots with an enlarged dot diameter but it is not yet sufficient.

As mentioned above, the studies are still on the way to develop a printing method and apparatus capable of providing at a satisfactorily high level various properties, e.g. fixing property of an ink, enlargement of the ink dot diameter, evenness of the density in ink dots, high optical density of ink dots themselves, or the like, which influence the quality of recorded images.

Meanwhile, with the purpose of further improvement of printing quality and image quality in the ink-jet printing technique (for example, improvement of water resistance and optical density (OD) of images on a printing medium), methods for providing an ink and a treatment liquid capable of reacting with the ink to a printing medium so as to cause a reaction of the ink and the treatment liquid with each other in the printing medium have been proposed and practically used.

Facts and Findings

The inventors of the present invention have studied the ink-jet printing technique in which a pigment-based ink and a treatment liquid capable of enacting with the pigment-based ink and capable of breaking the pigment dispersibility are employed in combination in order to solve the characteristic problems of a pigment-based ink and at the same time in order to utilize advantageous characteristics of the pigment-based ink. A recording process, in which a treatment liquid was applied so as to mix with a pigment-based ink on a printing medium in the liquid state either after or substantially at the same time of the application of the pigment-based ink onto the surface of the printing medium, was carried out as a part of the study. The quality of the resultant images was not necessarily satisfactory and in some cases the quality was rather found inferior to that of images formed using solely a pigment-based ink. Specifically, in the case where a pigment-based ink containing a pigment dispersed in an aqueous medium by a polymer dispersant was employed as a pigment-based ink in combination with a treatment liquid capable of reacting with the pigment-based ink, OD decrease attributed to the low area factor of the obtained ink dots was sometimes observed. The reason for occurrence of such a phenomenon is not clear, however, that is probably because the agglomeration of the pigment of the ink on the printing medium is significantly promoted by the treatment liquid. The area factor is, therefore, increased by increasing the shot-in ink quantity of a pigment-based ink to heighten OD, but in this case, fixing property is occasionally observed to be deteriorated.

A phenomenon 102 so called "exudation" or "haze" as shown in FIG. 1 was sometimes observed in the dots (see 101 of FIG. 1) of a printing medium obtained by combining a pigment-based ink containing a self-dispersing pigment as a pigment-based ink with a treatment liquid to react with the pigment-based ink. FIGS. 2A, 2, and 2C illustrate the assumed mechanism of occurrence of this phenomenon.

When a pigment-based ink $I_p$ containing a self-dispersing pigment but not containing a polymer dispersant is applied to a printing medium P (especially plain paper or the like) (see FIG. 2A) and then a treatment liquid S is applied thereon, generation of a reaction product starts (see FIG. 2B). As the reaction is proceeding, radial "exudation" occurs from approximately circular dots of the reaction product as illustrated in FIG. 2C and "haze" surrounds the circumference of the dots. Such "exudation" or "haze" is regarded as having the appearance of the phenomenon known as feathering, so that it causes deterioration of the printing quality.

The above-described "exudation" or "haze" is assumed to be due to the following phenomenon. A dispersant-free pigment-based ink has a relatively high reaction rate in reacting with the treatment liquid, so that the dispersion break down of the dispersed pigment occurs at once to produce clusters of the reaction product, and at the same time a finely granular reaction product is also produced. The granular reaction product then flows out with penetration of the treatment liquid in a printing medium, so that the above-described "exudation" is supposedly caused.

As described above, in the case where a pigment based ink and a treatment liquid were simply combined with each other, phenomena occurred that the inventors did not expect and high quality ink-jet recording images were difficult to obtain. The inventors recognized it was necessary to develop an innovative technique in order to meet the objectives of overcoming the disadvantages of a pigment-based ink while effectively utilizing the advantages of the pigment-based ink by employing an ink-jet recording technique using a treatment liquid for the pigment-based ink.

SUMMARY OF THE INVENTION

The present invention is achieved in consideration of the foregoing newly obtained technical knowledge and findings and the objectives of the present invention are to provide an ink-jet printing apparatus and a printing method to obtain high quality printing employing the ink-jet recording technique using a treatment liquid for a pigment-based ink.

The ink-jet printing apparatus according to one embodiment of the present invention to meet the foregoing objectives applies an ink containing a pigment dispersed in an aqueous medium to a printing medium and then applies a treatment liquid to react with the ink, wherein the ink contains a first pigment of a self-dispersing pigment having at least one anionic group bonded directly or through another atomic group to the surface of the first pigment or a self-dispersing pigment having at least one cationic group bonded directly or through another atomic group to the surface of the first pigment, a second pigment capable of being dispersed in an aqueous medium by a polymer dispersant, and at least one dispersant selected from a polymer dispersant having the same polarity as that of the group bonded to the surface of the first pigment and a nonionic polymer dispersant; and the ink-jet printing apparatus comprises application means for applying the ink and the treatment liquid separately to a printing medium to mix the ink and the treatment liquid with each other in a liquid state on the printing medium.

The ink-jet printing apparatus according to another embodiment of the present invention applies an ink containing a pigment dispersed in an aqueous medium to a printing medium and then applies a treatment liquid to react with the ink, wherein the ink contains a first pigment of a self-dispersing pigment having at least one anionic group bonded directly or through another atomic group to the surface of the first pigment or a self-dispersing pigment having at least one cationic group bonded directly or through another atomic group to the surface of the first pigment, a second pigment capable of being dispersed in an aqueous medium by a polymer dispersant, and at least one dispersant selected from a polymer dispersant having the same polarity as that of the group bonded to the surface of the first pigment and a nonionic polymer dispersant; and the ink-jet printing apparatus comprises application means for applying the ink and the treatment liquid separately to a printing medium to mix the ink and the treatment liquid with each other in a liquid state on the printing medium followed by applying the ink to the ink and the treatment liquid mixed on the printing medium to further mix therewith on the printing medium in a liquid state.

The ink-jet printing apparatus according to still another embodiment of the present invention carries out printing by ejecting an ink containing a pigment dispersed in an aqueous medium to a printing medium and then ejecting a treatment liquid to react with the ink by using an ink-ejecting portion for ejecting the ink and a treatment-liquid-ejecting portion for ejecting the treatment liquid, wherein the ink employed therefor contains a first pigment of a self-dispersing pigment having at least one anionic group bonded directly or through another atomic group to the surface of the first pigment or a self-dispersing pigment having at least one cationic group bonded directly or through another atomic group to the surface of the first pigment, a second pigment capable of being dispersed in an aqueous medium by a polymer dispersant, and at least one dispersant selected from a polymer dispersant having the same polarity as that of the group bonded to the surface of the first pigment and a nonionic polymer dispersant; and the ink-jet printing apparatus comprises at least one pigment-based-ink-ejecting portion for ejecting the ink in the ink-ejecting portion, arrangement means for arranging the pigment-based-ink-ejecting portion and the treatment-liquid-ejecting portion in a prescribed relative position and control means for relatively moving the respective ejecting portions to the printing medium, and for having the respective ejecting portions eject the ink and the treatment liquid respectively so as to mix the ink and the treatment liquid on the printing medium.

The ink-jet printing process according to an embodiment of the present invention to meet the foregoing objectives includes a process of recording images on a printing medium which comprises a first step of applying an ink on a printing medium by employing an ink-jet recording process and a second step of applying a treatment liquid capable of reacting with the ink, wherein the ink contains a first pigment and a second pigment dispersed in an aqueous medium, the first pigment being a self-dispersing pigment having at least one anionic group bonded directly or through another atomic group to the surface of the first pigment or a self-dispersing pigment having at least one cationic group bonded directly or through another atomic group to the surface of the first pigment and the second pigment being capable of being dispersed in an aqueous medium by a polymer dispersant; the ink further contains at least one dispersant selected from a polymer dispersant having the same polarity as that of the group bonded to the surface of the first pigment and a nonionic polymer dispersant; and the second step is conducted subsequently to the first step or substantially simultaneously with the first step so as to bring the ink and the treatment liquid into contact with each other in a liquid state on the printing medium.

By the invention according to the respective embodiments as described, high quality images with extremely high OD and high edge sharpness can be obtained and various desirable properties such as abrasion resistance and fixing properties can be improved. The reason for such effects by subsequent or substantially simultaneous application of the treatment liquid with respect to application of the ink containing the first pigment and the second pigment is not clear. The following facts have, however, been observed by the inventors from various experiments relating to the present invention. That is, when an ink containing the first pigment and the second pigment is applied to a printing medium, dots of the ink with certain surface areas are formed on the surface of the printing medium P as illustrated in FIG. 3A. The size (the diameter: d1) of the ink dots is larger than the size (the diameter: d2) of dots of a conventional pigment-based ink (an ink containing a pigment dispersed by a polymer dispersant or an ink containing a self-dispersing pigment) as illustrated in FIG. 3B (d1>d2). The reason why such a phenomenon is observed is not clear but it is assumed to be due to the following mechanism. That is, the second pigment on which the polymer dispersant has been adsorbed and the first pigment are electrically repulsed from each other in an ink so that the agglomeration force of the pigments in the ink gets weak as compared at least with that of an ink containing only a polymer-dispersant-dispersed pigment. In the case where such an ink is printed on a paper surface, the coloring materials in the ink hardly penetrate the paper in the thickness direction since the polymer dispersant has been adsorbed on the second pigment. On the other hand, in the horizontal (transverse) direction of the paper surface, the pigment is strongly agglomerated in the case of an ink containing a second pigment and a polymer dispersant since polymer molecules are rapidly entangled with one another with penetration of the solvent of the ink in the paper and decrease in water by evaporation or since cross-linking of the polymer with the pigment is caused. On the contrary, entangling and cross-linking of the polymer are prevented or suppressed owing to coexistence of a first pigment in the case of the ink of the embodiments so that the strong intermolecular force of pigments in the ink is moderated by the repulsion of the first pigment and the polymer dispersant. Thus, the ink is easily diffused in the transverse direction of the paper surface, and though the diffusion is moderated, the diffusion is believed not to be in disorder owing to the effect of the agglomeration force of the pigments.

When a treatment liquid S is applied to the ink dots evenly and widely diffused on the surface of a printing medium (see FIG. 2B and FIG. 2C), a reaction is caused in the interface of the ink and the treatment liquid. As described above, owing to the wide diffusion of the ink dots, reaction points with the treatment liquid are numerous as compare with those in the case of a conventional ink, and moreover, owing to the enlargement of the ink dots, the thickness (t1) of the ink dots is small as compared with the thickness (t2) of conventional ink dots on the surface of the printing medium so that the reaction with the treatment liquid is supposed to be completed within a short time. Consequently, it can be presumed that fixing time shortening, fixing property improvement as well as edge sharpness improvement of the ink dots are achieved in the embodiments of the present invention. According to the foregoing mechanism, it can clearly be understood that the effects of the embodiments are characteristically derived from the system where an ink is applied to a printing medium before or practically simultaneously with application of a treatment liquid.

For the embodiments of the present invention, in the case where a treatment liquid having excellent penetration properties to a printing medium is used, the fixing property and the edge sharpness of the ink dots are further improved. That is probably because a solvent including water becomes more penetrative and penetrates the printing medium owing to the penetrating force of the treatment liquid while the ink and the treatment liquid are reacting with each other. Generally, in the case where a coloring material penetrates a printing medium, optical density is usually decreased; nevertheless, in the case where an ink is applied prior to the application of the treatment liquid just as in the embodiments, pigment rarely penetrates the printing medium to such a degree that a decrease in OD is caused. A coloring material is rather made likely to remain in the surface and its periphery of a printing medium by the reaction with the treatment liquid, and as a result, OD is increased to a greater extent than that in the case where no treatment liquid is used.

Further, for the embodiments, it is preferable to use a treating liquid of which the components are optimized according to the type and the ratio of a first pigment and a second pigment in the ink to further heighten the image quality. That is, a self-dispersing pigment probably has a mine-like shape having a large number of whisker-like polar groups (anionic groups) as in the circumference of the pigment core as illustrated as a model in FIG. 4A. On the other hand, a polymer compound, for example, polyallylamine (PAA) having a large number of cationic groups in one molecule is generally illustrated as FIG. 4B. In the case where such compounds are mixed with a self-dispersing pigment, as illustrated in FIG. 5, a PAA polymer is entwined around the circumference of the self-dispersing pigment. The cationic group of PAA, however, cannot geometrically be bonded to every anionic group, and as a result, the reaction product of the self-dispersing pigment and PAA probably is in a cationic state as a whole. Thus, particles of a substance obtained by mutual reaction of pigment particles with a small diameter and PAA probably have weak intermolecular force and are liable to electrically repulse one another and are difficult to agglomerate to form a large complex. Consequently, it can be assumed that the fine particles are the cause of haze-like bleeding in the circumferences of dots. On the contrary, regarding a pigment dispersed by a polymer dispersant, the polymer dispersant itself has a large number of anionic groups or cationic groups. Accordingly, even when a compound having one cationic group or one anionic group in one molecule is included in the treatment liquid, the dispersibility of the polymer dispersant is not completely broken. Hence, by employing a treatment liquid containing a cationic polymer compound such as PAA and a cationic low molecular weight compound such as benzalkonium chloride in a prescribed ratio for an ink containing a first pigment having an anionic group bonded to the surface and a pigment dispersed by an anionic polymer dispersant, the dispersibility of the respective pigments in the ink is reliably broken on a printing medium so that production of unreacted cationic groups, which are a cause of haze, can be suppressed as much as possible. As a result, images with extremely high quality, high OD, no haze, and excellent fixing properties, can be formed on a printing medium within a short fixing time.

The ink-jet printing apparatus according to another embodiment of the present invention applies an ink containing coloring materials to a printing medium and then applies a treatment liquid for making the coloring materials of the ink insoluble, wherein the ink contains a first ink containing either a self-dispersing pigment having at least one anionic group bonded directly or through another atomic group to the surface of the first pigment or a self-dispersing pigment having at least one cationic group bonded directly or through another atomic group to the surface of the first pigment, a second ink containing a pigment capable of being dispersed in an aqueous medium by a polymer dispersant and at least one dispersant selected from a polymer dispersant having the same polarity as that of the group bonded to the surface of the first pigment and a nonionic polymer dispersant; and the ink-jet printing apparatus comprises application means for applying the first ink, the second ink, and the treatment liquid separately to a printing medium to mix the first ink, the second ink, and the treatment liquid in a liquid state on the printing medium.

The ink-jet printing apparatus according to another embodiment of the present invention carries out printing, using an ink-ejecting portion for ejecting an ink containing coloring materials to a printing medium and a treatment-liquid-ejecting portion for ejecting a treatment liquid for making the coloring materials of the ink ejected by the ejecting portion insoluble, by ejecting the ink to a printing medium and then ejecting the treatment liquid, wherein the ink-ejecting portion comprises a first ink-ejecting portion for ejecting a first ink containing either a self-dispersing pigment having at least one anionic group bonded directly or through another atomic group to the surface of the first pigment or a self-dispersing pigment having at least one cationic group bonded directly or through another atomic group to the surface of the first pigment and a second ink-ejecting portion for ejecting a second ink containing a pigment capable of being dispersed in an aqueous medium by a polymer dispersant and at least one dispersant selected from a polymer dispersant having the same polarity as that of the group bonded to the surface of the first pigment and a nonionic polymer dispersant; and the ink-jet printing apparatus comprises arrangement means for arranging the first ink-ejecting portion, the second ink-ejecting portion, and the treatment-liquid-ejecting portion in a prescribed relative position and control means for relatively moving the respective ejecting portions to the printing medium, and for having the respective ejecting portions eject the first ink, the second ink, and the treatment liquid respectively so as to mix the first ink, the second ink, and the treatment liquid on the printing medium.

The ink-jet printing process according to a further embodiment of the invention includes a process of recording images on a printing medium, the process comprising the steps of:

(i) applying an ink on a printing medium by employing an ink-jet recording process; and (ii) applying a treatment liquid capable of reacting with the ink, wherein the ink contains a first pigment and a second pigment dispersed in an aqueous medium, the first pigment being selected from a self-dispersing pigment having at least one anionic group bonded directly or through another atomic group to the surface of the first pigment and a self-dispersing pigment having at least one cationic group bonded directly or through another atomic group to the surface of the first pigment and the second pigment being capable of being dispersed in an aqueous medium by a polymer dispersant, the ink further containing at least one dispersant selected from a polymer dispersant having the same polarity as that of the group bonded to the surface of the first pigment and a nonionic polymer dispersant, and wherein the step (ii) is conducted subsequently to the step (i) or substantially simultaneously with the step (i) so as to bring the ink and the treatment liquid into contact with each other in a liquid state on the printing medium.

The ink-jet printing process according to the first embodiment of the present invention comprises the steps of:

respectively applying a first ink, a second ink, and a treatment liquid reactable with at least one of the first and the second ink to the surface of a printing medium in such a manner that the respective first ink, second ink and treatment liquid are brought into contact with each other on the surface of a printing medium in a liquid state, wherein the first ink contains either a self-dispersing pigment having at least one anionic group bonded directly or through another atomic group to the surface of the first pigment or a self-dispersing pigment having at least one cationic group bonded directly or through another atomic group to the surface of the first pigment; the second ink contains a pigment capable of being dispersed in an aqueous medium by a polymer dispersant and at least one dispersant selected from a polymer dispersant having the same polarity as that of the group bonded to the surface of the self-dispersing pigment and a nonionic polymer dispersant; the treatment liquid contains a compound having the opposite polarity to that of the group bonded to the surface of the self-dispersing pigment; and the treatment liquid is applied after application of at least one of the first ink and the second ink to a printing medium.

BRIEF DESCRIPTION OF THE DRAWINGS

FIG. 1 is a hypothetical illustration presumably describing an "exudation" phenomenon of a reaction product of an ink and a treatment liquid.

FIGS. 2A, 2B and 2C are hypothetical illustrations presumably describing dot formation at the time of a reaction of a treatment liquid with an ink applied to a printing medium in accordance with one embodiment of the invention.

FIG. 3A is a schematic illustration of a condition where an ink in accordance with the invention has been applied to the surface of a printing medium.

FIG. 3B is a schematic illustration of a condition where a conventional ink has been applied to the surface of a printing medium.

DETAILED DESCRIPTION OF THE PREFERRED EMBODIMENTS

Embodiment 1-1

Figure 4A:
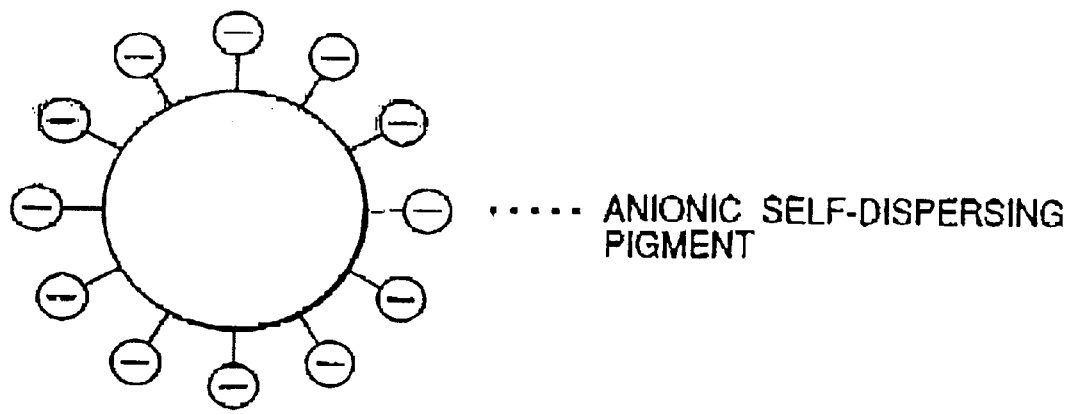
FIG. 4A is a hypothetical illustration of the molecule of an anionic self-dispersing pigment.

The ink-jet recording process according to one embodiment of the present invention includes an image dot generation process comprising the steps of applying an ink containing first and second pigments to a printing medium and thereafter or substantially simultaneously therewith applying a treatment liquid capable of reacting with the ink so that the ink and the treatment liquid come into contact to react with each other in a liquid state on the printing medium.

(Ink)

Inks applicable to the embodiment described above include, for example, one which contains first and second pigments as a coloring material, dispersed in an aqueous medium, the first pigment being a self-dispersing pigment having at least one anionic group bonded directly or via another atomic group to the surface of the first pigment or a self-dispersing pigment having at least one cationic group bonded directly or via another atomic group to the surface of the first pigment, the second pigment being a pigment which can be dispersed in the aqueous medium with the aid of a polymer dispersant or a nonionic polymer dispersant, and further contains at least one dispersant selected from a polymer dispersant having the same polarity as that of the group bonded to the surface of the first pigment and a nonionic polymer dispersant.

The components of this ink will be described in order below.

(First Pigment)

The term "self-dispersing pigment" used herein refers to pigments which can stably keep themselves dispersed in water, a water-soluble organic solvent or a liquid mixture thereof and never form an aggregate of themselves in the above liquid, which obstructs normal ink ejection from orifices in which ink-jet recording technology is utilized.

(Anionic Self-dispersing CB)

As for a pigment as described above, for example, suitably used are those having at least one anionic group bonded on their surface directly or via some other atomic groups. The specific examples of the pigments include carbon black having at least one anionic group bonded to its surface directly or via some other atomic groups.

The anionic groups bonded to the surface of the carbon black include, for example, —COOM, —SO$_3$M, —PO$_3$HM and —PO$_3$M$_2$ (wherein M represents a hydrogen atom, alkaline metal, ammonium or organic ammonium, R represents a linear or branched alkyl group having 1 to 12 carbon atoms, a substituted or unsubstituted phenyl group, or a substituted or unsubstituted naphthyl group). When R is a phenyl group having substituent groups or a naphthyl group having substituent groups, the substituent groups include, for example, a linear or branched alkyl group having 1 to 6 carbon atoms.

The alkaline metals represented by "M" described above include, for example, lithium, sodium and potassium, and the organic ammoniums of "M" include, for example, mono-, di-, and tri-methylammonium, mono-, di-, and tri-ethylammonium and mono-, di-, and tri-methanolammonium.

Of the anionic groups described above, —COOM and —SO$_3$M are particularly preferable because they are highly effective in stabilizing the dispersibility of carbon black.

The various anionic groups described above are preferably used in such a state that they are bonded to the surface of carbon black via some other atomic groups. Some other atomic groups include, for example, a linear or unsubstituted alkylene group having 1 to 12 carbon atoms, a substituted or unsubstituted phenylene group, or a substituted or unsubstituted naphthylene group. And substituent groups which may be bonded to phenylene groups or naphthylene groups include, for example, a linear or branched alkyl group having 1 to 6 carbon atoms.

Specific examples of anionic groups bonded to the surface of carbon black via some other atomic groups include, for example, —C$_2$H$_4$COOM, —PhSO$_3$M and —PhCOOM (wherein Ph represents a phenyl group). However, it is to be understood that the present invention is not intended to be limited to the specific examples.

Carbon black having the above-described anionic group bonded to its surface directly or via some other atomic groups can be produced by the methods, for example, described below.

One method of introducing —COONa onto the surface of carbon black is, for example, to subject the commercially available carbon black to oxidative treatment with sodium hypochlorite.

And one method of bonding an —Ar—COONa group (wherein Ar represents an aryl group) onto the surface of carbon black, for example, is to form a diazonium salt by letting nitrous acid act on an NH$_2$—Ar—COONa group, thereby bonding the above salt onto the surface of carbon black. However, it is to be understood that the present invention is not intended to be limited to the specific examples.

(Cationic Self-dispersing CB)
(Cationically Charged CB)

Cationically charged carbon blacks include, for example, one having at least one quaternary ammonium group selected from the group shown below bonded to the surface thereof.

Quaternary Ammonium Groups:

—NH$_3^+$, —NR$_3^+$, —SO$_2$NH$_2$, —SO$_2$NHCOR

[Chemical Formula 2]

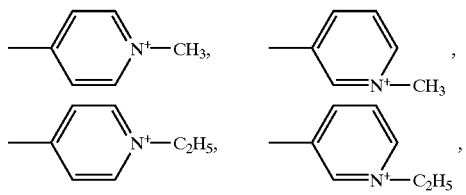

-continued

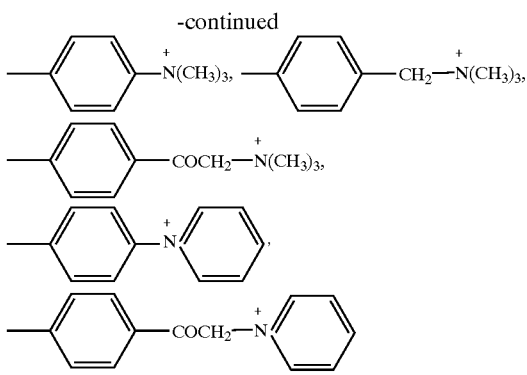

wherein R represents, for example, a linear or branched alkyl group having 1 to 12 carbon atoms, a substituted or unsubstituted phenyl group, or a substituted or unsubstituted naphthyl group. And the substituent groups of the phenyl group or the naphthyl group include, for example, a linear or branched alkyl group having 1 to 6 carbon atoms.

Processes of producing cationically charged self-dispersing carbon black with the hydrophilic groups described above bonded thereto include, for example, a process in which N-ethylpyridyl group having a structure shown below

[Chemical Formula 3]

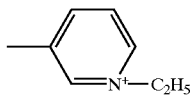

is bonded to the surface of carbon black, more specifically in which carbon black is treated with 3-amino-N-ethylpyridinium bromide. The carbon black anionically or cationically charged by introducing a hydrophilic group onto its surface has an excellent water-dispersing ability due to the repulsion of ions; therefore, when contained in ink, it can keep itself in a stable dispersing state without the addition of a dispersing agent, etc.

Hydrophilic groups of various types described above may be directly bonded onto the surface of carbon black. Alternatively, they may be indirectly bonded onto the surface of carbon black with some other atomic groups intervening between the surface of carbon black and the hydrophilic group. Specific examples of some other atomic groups described above include, for example, a linear or branched alkylene group having 1 to 12 carbon atoms, a substituted or unsubstituted phenylene group, and a substituted or unsubstituted naphthylene group. And substituent groups bonded to the phenylene group or the naphthylene group include, for example, a linear or branched alkyl group having 1 to 6 carbon atoms. Specific examples of the combination of some other atomic groups and hydrophilic groups include, for example, —$C_2H_4$—COOM, —Ph—$SO_3$M and —Ph—COOM (wherein Ph represents a phenyl group).

Regarding the particles of the self-dispersing pigment contained in the ink according to the embodiment, preferably those having a diameter of 0.05 to 0.3 $\mu$m account for 80% or higher of the whole pigment, and more preferably those having a diameter of 0.1 to 0.25 $\mu$m account for 80% or higher of the same. The process of preparing such ink is just the same as that of the examples described later.

(Second Pigment)

The second pigment applicable to the ink according to this embodiment includes one which can be dispersed in a dispersing medium, specifically e.g. an aqueous medium, of the ink with the aid of the action of a polymer dispersant. Specifically, suitably used are such pigments that can be stably dispersed only after a polymer dispersant is adsorbed on the surface of the pigment particles. Such pigments include, for example, carbon black pigments such as furnace black, lamp black, acetylene black and channel black. The specific examples of such carbon black pigments are described below, and each of the carbon black pigments can be used alone or in proper combination.

Carbon Black Pigments:
  Raven 7000, Raven 5750, Raven 5250, Raven 5000 ULTRA, Raven 3500, Raven 2000, Raven 1500, Raven 1250, Raven 1200, Raven 1190 ULTRA-II, Raven 1170 and Raven 1255 (available from Columbia Co., Ltd.)
  Black Pearls L, Regal 400R, Regal 330R, Regal 660R, Mogul L, Monarch 700, Monarch 800, Monarch 880, Monarch 900, Monarch 1000, Monarch 1100, Monarch 1300, Monarch 1400 and Valcan XC-72R (available from Cabot Co., Ltd.)
  Color Black FW1, Color Black FW2, Color Black FW2V, Color Black 18, Color Black FW200, Color Black S150, Color Black S160, Color Black S170, Printex 35, Printex U, Printex V, Printex 140U, Printex 140V, Special Black 6, Special Black 5, Special Black 4A and Special Black 4 (available from Degussa Co., Ltd)
  No. 25, No. 33, No. 40, No. 47, No. 52, No. 900, No. 2300, MCF-88, MA 600, MA 7, MA 8, MA 100 (available from Mitsubishi Chemical Industries Ltd.)

The other black pigments include, for example, fine particles of magnetic materials such as magnetite and ferrite and titanium black.

In addition to the black pigments described above, blue pigments and red pigments can also be used.

The amount of coloring materials, which is the sum of the first and the second pigments, preferably ranges from 0.1 to 15% by weight of that of the whole ink, more preferably 1 to 10% by weight. The ratio of the first pigment to the second pigment is preferably in the range of 5/95 to 97/3 by weight, more preferably 10/90 to 95/5 by weight. Much more preferably the first pigment/the second pigment ratio= 9/1 to 4/6. As for the other preferable range, the amount of the first pigment is larger than that of the second pigment. In cases where the amount of the first pigment is larger than that of the second pigment, it is achieved not only that the ink exhibits the dispersion stability, but also that the head of the ink-jet printing apparatus exhibits the ejection stability, In particular, the ejection stability including ejection efficiency as well as ejection reliability which is attributed to less wetting on the ink-ejecting side.

Viewed from behavior of inks on paper, the ink containing less second pigment on which a polymer dispersant is adsorbed spreads effectively on the surface of paper; thus it is presumed that a uniform thin film of the polymer dispersant is formed on the paper, as a result of which abrasion resistance of images is improved.

As a polymer dispersant for uniformly dispersing the above second pigment, suitably used is, for example, one which is adsorbed on the surface of the above second pigment and functions to stably disperse the above second pigment in an aqueous medium. Such polymer dispersants include, for example, anionic polymer dispersants, cationic polymer dispersants and nonionic polymer dispersants.

(Anionic Polymer Dispersant)

Anionic polymer dispersants include, for example, polymers consisting of monomers as a hydrophilic group and those as a hydrophobic group, and the salts thereof. The specific examples of monomers as hydrophilic groups include, for example, styrene sulfonic acid, α,β-ethylenically unsaturated carboxylic acid, derivatives of α,β-ethylenically unsaturated carboxylic acid, acrylic acid, derivatives of acrylic acid, methacrylic acid, derivatives of methacrylic acid, maleic acid, derivatives of maleic acid, itaconic acid, derivatives of itaconic acid, fumaric acid and derivatives of fumaric acid.

The specific examples of monomers as hydrophobic groups include, for example, styrene, derivatives of styrene, vinyltoluene, derivatives of vinyltoluene, vinylnaphthalene, derivatives of vinylnaphthalene, butadiene, derivatives of butadiene, isoprene, derivatives of isoprene, ethylene, derivatives of ethylene, propylene, derivatives of propylene, alkylesters of acrylic acid and alkylesters of methacrylic acid.

The specific examples of the salt used herein include, for example, onium compounds of hydrogen, alkaline metal, ammonium ion, organic ammonium ion, phosphonium ion, sulfonium ion, oxonium ion, stibonium ion, stannonium ion and iodonium; however, the present invention is not intended to be limited to the specific examples. To the above-described polymers and the salt thereof, poly (oxyethylene) group, hydroxyl group, acrylamide, derivatives of acrylamide, (dimethylamino)ethylmethacrylate, ethoxyethyl methacrylate, butoxyethyl methacrylate, ethoxytriethylene methacrylate, methoxypolyethyleneglycol methacrylate, vinylpyrrolidone, vinylpyridine, vinyl alcohol and alkylether may be appropriately added.

(Cationic Polymer Dispersant)

As a cationic polymer dispersant, used are tertiary amine monomers and copolymers of the monomers obtained by quaternarizing the above amine monomers and hydrophobic monomers. The tertiary amine monomers used include, for example, N,N-(dimethylamino)ethylmethacrylate, N,N-dimethyacrylamide. The hydrophobic monomers used include, for example, styrene, derivatives of styrene and vinylnaphthalene. When using tertiary amine monomers, in order to form the salt thereof, compounds such as sulfuric acid, acetic acid and nitric acid are used. The monomers are also applicable which are obtained by quaternarizing the above amine monomers with methyl chloride, dimethylsulfuric acid or the like.

(Nonionic Polymer Dispersant)

The nonionic polymer dispersants used include, for example, poly(vinylpyrrolidone), polypropylene glycol and vinylpyrrolidone-vinyl acetate copolymer.

The above-described first and second pigments and polymer dispersants are appropriately selected to be combined with each other, and dispersed and dissolved in an aqueous medium, so as to obtain the ink of the embodiment. When using, as the first pigment, a self-dispersing pigment having at least one anionic group bonded onto its surface directly or via some other atomic groups, the use of at least one polymer dispersant selected from the group consisting of anionic polymer dispersants and nonionic polymer dispersants in combination with the above pigment is preferable in terms of the stability of the ink. And when using, as the first pigment, a self-dispersing pigment having at least one cationic group bonded onto its surface directly or via some other atomic groups, the use of at least one polymer dispersant selected from the group consisting of cationic polymer dispersants and nonionic polymer dispersants in combination with the above first pigment is preferable for the same reason as above.

The ratio of the second pigment to the polymer dispersant used for dispersing the above second pigment in ink is preferably 5:0.5 to 5:2 by weight; however, the present invention is not intended to be limited to the specific examples.

(Aqueous Medium)

As an aqueous medium, which is to be a dispersion medium for the first and the second pigments, water-soluble organic solvents may be used. The water-soluble organic solvents include, for example, alkyl alcohols having 1 to 5 carbon atoms such as methyl alcohol, ethyl alcohol, n-propyl alcohol, isopropyl alcohol, n butyl alcohol, sec-butyl alcohol, tert-butyl alcohol, isobutyl alcohol and n-pentanol; amides such as dimethylformamide and dimethylacetamide; ketones or keto alcohols such as acetone and diacetone alcohol; ethers such as tetrahydrofuran and dioxane; oxyethylene or oxypropylene copolymers such as diethylene glycol, triethylene glycol, tetraethylene glycol, dipropylene glycol, tripropylene glycol and polyethylene glycol; alkylene glycols of which the alkylene group contains 2 to 6 carbon atoms such as ethylene glycol, propylene glycol, trimethylene glycol, triethylene glycol and 1,2,6-hexanetriol; glycerol; lower alkyl ethers such as ethylene glycol monomethyl (or monoethyl) ether, diethylene glycol monomethyl (or monoethyl) ether and triethylene glycol monomethyl (or monoethyl) ether; lower dialkyl ethers of polyhydric alcohols such as triethylene glycol dimethyl (or diethyl) ether and tetraethylene glycol dimethyl (or diethyl) ether; alkanolamines such as monoethanolamine, diethanolamine and triethanolamine; sulfolane, N-methyl-2-pyrrolidone, 2-pyrrolidone, 1,3-dimethyl-2-imidazolidinone. These water-soluble organic solvents can be used alone or in combination.

(Penetrability of Ink into Recording Medium)

When considering the penetrability of ink into a printing medium and regulating the Ka value to be maintained, for example, less than 1 (ml·m$^{-2}$·msec$^{-\frac{1}{2}}$), the use of the ink of this embodiment, which contains various types of components described above, in combination with a treatment liquid described later, makes it possible to obtain image dots having an extremely uniform density, a sharp edge and an excellent fixing rate and properties with respect to the printing medium. The penetrability of ink into a printing medium will be described below.

It is known that when the penetrability of ink is expressed by the amount of ink per m$^2$, V, the amount of ink hating penetrated Into a medium at a time when time t has elapsed since the instance of ink droplet ejection, V, is shown by the Bristow's method below.

$$V = Vr + Ka(t-tw)^{1/2} \qquad \text{[Equation 1]}$$

wherein t>tw.

Most ink droplets are absorbed by the irregular portions of the printing medium surface (rough portions of the printing medium surface) and do not start penetrating into the printing medium immediately after dropping onto the surface of a printing medium. Time tw (wet time) represents the above-described time period during which the ink droplets are absorbed only by the irregular portions of the printing medium surface, and volume Vr represents the amount of ink droplets absorbed by the irregular portions. If the elapsed time from the instance of dropping ink droplets exceeds tw, the amount of the ink having penetrated into the printing medium, V, increases in proportion to the one-half power of the excess time (t–tw). Ka represents the proportionality constant of the increment (t–tw)$^{1/2}$ and its value depends on the penetrating rate of ink.

The Ka values were measured with Dynamic Penetrability Tester S for Liquids (by Toyo Seiki Co., Ltd.) based on the Bristow's method. In this experiment, PB paper from Canon Inc. was used as a printing medium (recording paper). This PB paper can be used in a copying machine and a LBP utilizing a electrophotographic process as well as in printing utilizing an ink-jet recording process.

When using PPC paper, paper for electrophotography from Canon Inc., similar results were obtained.

The Ka value depends on the type and the amount of surfactant added. For example, the addition of a nonionic surfactant of ethylene oxide-2,4,7,9-tetramethyl-5-decene-4,7-diol (hereinafter referred to as "Acetylenol EH," a brand name of Kawaken Fine Chemicals Co., Ltd.), increases the penetrability.

For the ink without Acetylenol EH (with Acetylenol EH content of 0%), its penetrability is low and it has the properties for over-coating type inks specified later. For the ink of which Acetylenol EH content is 1%, it penetrates into recording paper in a short period of time and has the properties for highly-penetrable inks specified later. And for the ink of which Acetylenol EH content is 0.35%, It has the properties for semi-penetrable inks, intermediate between the above two ink types.

TABLE 1

| | Ka value $(ml/(m^2 \cdot msec^{1/2})$ | Acetylenol EH content (%) | Surface tension (dyne/cm) |
|---|---|---|---|
| Over-coating type ink | smaller than 1 | not lower than 0 but lower than 0.2 | not smaller than 40 |
| Semi-penetrable ink | not smaller than 1 but smaller than 5 | not lower than 0.2 but lower than 0.7 | not smaller than 35 but smaller than 40 |
| Highly-penetrable ink | not smaller than 8 | not lower than 0.7 | Smaller than 35 |

Table 1 above shows Ka value, Acetylenol EH content (%) and surface tension (dyne/cm) of each of "over-coating type ink", "semi-permeable ink" and "highly-permeable ink". As seen from the table, an ink having a larger Ka value has a higher penetrability to recording paper as a printing medium. In other words, an ink having a smaller surface tension has a higher penetrability.

The Ka values shown in Table 1 were measured with Dynamic Penetrability Tester S for Liquids (by Toyo Seiki Co., Ltd.) based on the Bristow's method, as described above. In this experiment, the aforementioned PB paper from Canon Inc. was used as recording paper. And similar results were obtained for the aforementioned PPC paper from Canon Inc.

The ink of the type specified as "highly-penetrable ink" herein has Acetylenol EH content of 0.7% or higher, which is in the range of good penetrability. The standard penetrability set for the ink of this embodiment is preferably smaller than the Ka value of "over-coating type ink," that is, smaller than 1.0 $(ml \cdot m^{-2} \cdot msec^{-1/2})$, more preferably smaller than 0.4 $(ml \cdot m^{-2} \cdot msec^{-1/2})$.

(Addition of Dye)

Dyes may be added to the ink of the embodiment described above. The ink which contains the first and the second pigments as well as the dispersant for dispersing the second pigment in an aqueous medium and further contains a dye added thereto, when used in combination with a treatment liquid described later, makes it possible to generate excellent image dots on a printing medium in a shorter fixing time. Although it has been already mentioned that the aggregating force of the second pigment is eased in the presence of the first pigment, it is also considered that the addition of a dye further eases the aggregating force of the second pigment, thereby ununiformity in a printed image, such as "crazing", which often occurs on a recording medium having poor ink absorbency compared with plain paper, etc. can be effectively prevented from occurring. Dyes applicable to the ink of this embodiment include, for example, an anionic dye and a cationic dye. Preferably the dye having the same polarity as that of the group bonded to the surface of the first pigment is adopted.

(Anionic and Cationic Dyes)

As the anionic dyes described above which are soluble in an aqueous medium and can be used in this embodiment, known acid dyes, substantive dyes and reactive dyes are suitably used. As the cationic dyes, known basic dyes are suitably used. Preferably used are anionic and cationic dyes having a disazo- or trisazo-structure as a skeletal structure. Further, preferably two or more dyes different in skeletal structure are used jointly. Dyes other than black dyes, such as cyan, magenta and yellow dyes, may be used as long as their tones do not differ greatly.

(Amount of Dye Added)

The amount of dyes added ranges from 5 to 60 wt % of the whole coloring material. However, taking into consideration making good use of the effect of mixing the first and second pigments, the amount of dye added is preferably lower than 50 wt %. In the ink in which the printing property on plain paper is regarded as of major importance, the amount of dye added preferably ranges from 5 to 30 wt %.

(Treatment Liquid)

With regard to treatment liquids used in the above embodiment, when the first pigment contained in the above ink has anionic groups bonded onto its surface, suitably used are those containing compounds having cationic groups capable of reacting with the above anionic groups. On the other hand, when the first pigment contained in the above ink has cationic groups bonded onto its surface, suitably used are those containing compounds having anionic groups capable of reacting with the above cationic groups.

The above cationic compounds include, for example, compounds with a relatively low molecular weight which have about one cationic group per molecule and compounds with a relatively high molecular weight which have multiple cationic groups per molecule. The preferable examples of cationic compounds with a relatively low molecular weight include, for example, primary- or secondary- or tertiary-amine salt type compounds such as hydrochlorides and acetates of laurylamine, coconut amine, stearylamine and rosinamine; quaternary ammonium salt type compounds such as lauryltrimethylammonium chloride, lauryldimethylbenzylammonium chloride, benzyltributylammonium chloride, benzalkonium chloride and cetyltrimethylammonium chloride; pyridinium salt type compounds such as cetylpyridinium chloride and cetylpyridinium bromide; imidazoline type cationic compounds such as 2-heptadecenyl-hydroxyimidazoline; and ethylene oxide adducts of secondary alkylamine such as dihydroxyethylstearylamine.

For the present invention, amphoteric surfactants showing cationic characteristics in a certain pH range can also be used. Specific examples of such amphoteric surfactants include, for example, $RNHCH_2$—$CH_2COOH$ type compounds, which are amino acid type amphoteric surfactants, and betaine type compounds such as stearyldimethylbetaine and lauryldihydroxyethylbetaine. It goes without saying that, when using any one of these amphoteric surfactants, preferably the liquid composition is prepared to have a pH value lower than the isoelectric point of the surfactant, or preferably the liquid composition Is prepared to have a pH value lower than the isoelectric point of the surfactant when it is mixed with an ink on a recording medium. The polymer components of the cationic compounds include, for example, poly(allylamine), poly(amine sulfone), poly(vinylamine), chitosan, and the products thereof neutralized or partially neutralized with acids such as hydrochloric acid and acetic acid.

As the above anionic compounds, anionic surfactants, for example, can be used. As the anionic surfactants, those commonly used, such as carboxylate type, sulfate ester type, sulfonate type and phosphoric ester type, can be used. The anionic polymer components include, for example, alkaline-soluble resins such as poly(sodium acrylate) or polymers partially copolymerized with acrylic acid. It goes without saying that the present invention is not intended to be limited to specific examples. To be more specific, the anionic compounds include, for example, disodium lauryl sulfosuccinate, disodium polyoxyethylenelauroylethanolamidoester sulfosuccinate, disodium polyoxyethylenealkylsulfosuccinate, sodium salts of carboxylated polyoxyethylenelaurylether, sodium salts of carboxylated polyoxyethylenelaurylether, sodium salts of carboxylated polyoxyethylenetridecylether, sodium polyoxyethylenelaurylethersulfate, triethanolamine polyoxyethylenelaurylethersulfate, sodium polyoxyethylenealkylethersulfate, sodium polyoxyethylenealkylethersulfate, sodium alkylsulfate and triethanolamine alkylsulfate. However, the present invention is intended to be limited to these specific examples.

The components forming the above treatment liquid may include water, water-soluble organic solvents and other additives, in addition to the cationic or anionic compounds described above. The water-soluble organic solvents used include, for example, amides such as dimethylformamide and dimethylacetamide; ketones such as acetone; ethers such as tetrahydrofuran and dioxane; a polyalkylene glycols such as polyethylene glycol, polypropylene glycol; alkylene glycols such as ethylene glycol, propylene glycol, butylene glycol, triethylene glycol, 1,2,6-hexanetriol, thiodiglycol, hexylene glycol and diethylene glycol; lower alkyl ethers of polyhydric alcohols such as ethylene glycol methyl ether, diethylene glycol monomethyl ether and triethylene glycol monomethyl ether; monohydric alcohols such as ethanol, isopropyl alcohol, n-butyl alcohol and isobutyl alcohol; in addition, glycerol, N-methyl-2-pyrrolidone, 1,3-dimethylimidazolidinone, triethanolamine, sulfolane, dimethyl sulfoxide. The above water-soluble organic solvents are not restricted to any fixed content; however, the content preferably ranges from 5 to 60 wt % of the whole liquid, more preferably 5 to 40 wt %.

In order to improve the fixing rate and fixing properties of image dots on a printing medium, in this embodiment, preferably the above-described treatment liquid is prepared to have a high penetrability to the printing medium.

In this embodiment, as long as the ink and the liquid treatment are provided to a printing medium in this order, as described above, the above desired results can be obtained. In cases where the above ink and the above treatment liquid are provided onto a printing medium at almost the same time, but so timely that the treatment liquid never impacts on the printing medium before the ink does, the desired results are also obtained. Accordingly, such cases are considered to be the same as the cases where the treatment liquid is provided after the ink is done.

With regard to the actual arrangement determining the order of providing the ink and the treatment liquid, for example, when using a serial type head, the above-described order is realized by multiple time scanning while conveying recording paper between the subsequent scanning operation Such a case is also embraced by the present invention.

As described above, the ink of the present invention is provided to a printing medium before the liquid treatment is done. Although the present invention has been described taking the case where the ink is provided in the form of a droplet before the treatment liquid is done, the number of the ink droplets is not necessarily limited to one.

For example, the ink may be provided in the form of two droplets before the treatment liquid is done. In this case, preferably one of the two ink droplets provided earlier contains the second pigment at a content higher than that of the first pigment, while the other ink droplet provided later contains the first at a content higher than that of the second pigment. As a result, when the ink reacts with the treatment liquid subsequently provided, firstly the second pigment mostly reacts with the treatment liquid, and the flow-out of the reaction product of the first pigment and the treatment liquid can be further suppressed. In another preferable embodiment which is to bring similar results, the mixed ink is provided in the form of three droplets to a printing medium before the treatment liquid is provided, in which case the content of the second pigment contained in the ink droplets increases in the reverse order in which they are to be provided.

In cases where the ink is provided in the form of multiple droplets as described above, the total amount of the ink provided is set to be almost the same as in cases where the ink is provided in the for of one droplet. In other words, according to the embodiment of the present invention, even if the ink is provided in the form of multiply divided droplets and the amount of each droplet decreases according to the number of the droplets, the above-described desired results can be obtained.

In this embodiment, as long as the above desired results can be obtained, the time lag from the instance of providing the ink to the instance of providing the treatment liquid does not matter, like the order of providing the ink. Any time lag, as long as it brings the above desired results, is embraced by the present invention.

In other words, the reaction of the mixed ink and the treatment liquid occurs in various forms depending on the time lag from the instance of providing the ink to the instance of providing the treatment liquid. It has been observed that, for example, even when the above time lag is short, the pigments etc. and the treatment liquid are satisfactorily mixed on the periphery of, or the edge portion of a dot, which is formed by piling up the ink and the treatment liquid, and the effects can be achieved at least on suppressing "haze".

From this standpoint, the term "mix" of ink and a treatment liquid used herein means not only mix as a whole, but also mix in parts. Further, it means mix occurring after the ink and the treatment liquid penetrate into a printing medium. And herein all these forms of mix are defined as "mix in a liquid state".

The color tone (type), density and number of the ink provided to a printing medium in this embodiment can be combined in a desired manner, as long as the ink is provided according to the order described above. The ink types commonly used include, for example, black (Bk), yellow (Y), magenta (M) and cyan (C). And several levels of brightness can be selected for each ink type. To be more specific, the ink-jet recording process of the present invention may be made up of, for example, selecting at least one ink selected from a yellow ink, a magenta ink and a cyan ink as a mixed ink of this embodiment and applying the mixed ink and the treatment liquid to a printing medium in this order.

Of the combinations to which the present invention is applicable, the most preferable one is to select a black ink as the mixed ink. The reason is that each effect of this embodiment, such as increase in OD value and suppression of "haze", can effectively contribute to the quality of printed characters when adopting such a combination.

There are proposed various processes of providing the ink and the like to a printing medium: its application to the medium, its direct contact with the medium, and so on. All those processes are embraced in the present invention; however, the most preferable one is an ink-jet process utilizing print heads. In this process, the combination and arrangement of print heads, as ink-ejecting portions, can be determined according to the order of providing the ink as well as the combination of ink types including the treatment liquid, described above.

To be specific, the order of providing an ink and a treatment liquid, described above, is made possible by such a constitution that the print heads for the ink and the treatment liquid are arranged in the direction in which the print heads travel relative to a printing medium.

To be more specific, the method of providing ink and a treatment liquid according to the present invention described above is made possible by any of the following types of print head: what is called the full multi-type print head in which ink-ejecting ports are arranged in the range corresponding to the entire width of printing area of the printing medium to be conveyed and what is called the serial-type print head which travels on a printing medium for scanning.

As ink ejecting methods of these print heads, any known methods, such as piezo ink-jet method, can be adopted. However, the most preferable method is such that bubbles are generated in the ink and the treatment liquid utilizing heat energy and the ink and the treatment liquid are ejected with the aid of the pressure of the bubbles.

The above ejected ink and treatment liquid are piled up on the same position, because the range in which they are piled up is controlled for each unit pixel by each print head. However the application of the present invention is not intended to be limited to this constitution. The present invention also includes such constitution that the desired results of this embodiment are brought by piling up the part of the ink dot and the treatment liquid and such constitution that the treatment liquid is provided intermittently for the data of each pixel so that the treatment liquid flowing in from the adjacent pixel due to bleeding reacts with the pigment etc.

Embodiment 1-2

Another embodiment of the present invention will be described below.

This embodiment aims at high-speed fixing of ink by increasing penetrability of the treatment liquid of the above embodiment.

The high-speed fixing of ink is a significant factor for enhancing printing speed, or enhancing throughput. Throughput can be enhanced directly by increasing the drive frequency of print heads and the conveyance speed of a printing medium. However, in cases where ink on a printing medium is not fully fixed thereon even after printing is completed and the printing medium is delivered, handling such a medium is not easy. Furthermore, in such a construction that, for example, sheets of paper as a printing medium delivered are piled up, the ink not having been fixed on one sheet of paper may stain the other sheets of paper.

Of various factors contributing to the enhancement of printing speed, that directly thought of is the delivering speed of a printing medium having been subjected to printing. And the above delivering speed depends on the conveyance speed of a printing medium or the scanning speed of print heads. Specifically, in an apparatus using what is called the full multi-type print heads, the conveyance speed of a printing medium in a printing operation is directly related to the delivering speed of a printing medium, while in an apparatus using what is called the serial type-print heads, the scanning speed of the heads is closely related to and finally determines the delivering speed of a printing medium having been subjected to printing. And the above delivering speed of a printing medium correlates with ink-ejecting cycle for a pixel via print resolution, in other words, dot density. Specifically, in such a construction that a single pixel is printed with ink ejected from multiple print heads, when considering the above print resolution is fixed, the ejecting cycle for the pixel correlates with the above-described conveyance speed.

On the other hand, considering the aforementioned technical problems related to the reaction between a pigment-based ink and a treatment liquid, preferably the time interval is set long from the instance of ejecting ink to the instance of ejecting a treatment liquid. The reason is that the aforementioned problematic phenomena are unlikely to occur when the pigment-based ink reacts with the treatment liquid after penetrating into a printing medium. In other words, the aforementioned problems arising in printing using a pigment-based ink and a treatment liquid may obstruct the enhancement of printing speed. The problem of obstructing the enhancement of printing speed is remarkable especially when using a pigment-based ink with a low penetrating rate so as to enhance OD value.

In this embodiment, a treatment liquid with a high penetrating rate is provided subsequently after an ink is provided to a printing medium, thereby the actions described in the above embodiment 1 are produced, in addition, penetrability of an ink with a relatively low penetrating rate is enhanced. If penetrating rates of a mixed ink and a treatment liquid are expressed by v1 and v2, respectively, $v1<v2$ holds. The presumable phenomenon of this case is shown in FIG. 6.

Figure 6:
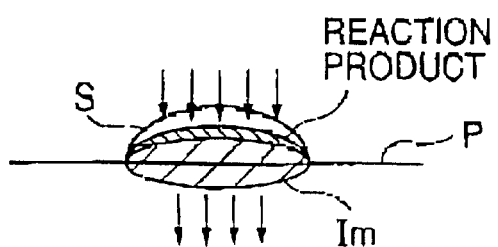
FIG. 6 is a hypothetical illustration presumably describing dot formation at the time of the reaction of a treatment liquid with a pigment-based ink and a dye-based ink on a printing medium after mixing these inks on the printing medium in accordance with one embodiment of the invention.

Referring to FIG. 6, there is shown a schematic view illustrating a state in which a mixed ink $I_m$ and a treatment liquid S are provided to a printing medium P in this order. In this case, a reaction product starts to be generated between the treatment liquid S and the mixed ink $I_m$ in contact therewith at their interface, and the penetrating rate of the mixture thereof is higher than that of the mixed ink alone. Thus, the penetrating rate as a whole becomes higher compared with that of the mixed ink alone, which enables high-speed fixing.

In this embodiment, even when adopting a mixed ink with a low penetrating rate so as to enhance OD value, the use of a treatment liquid with a high penetrating rate enables relatively high-speed fixing.

Embodiment 1-3

Another embodiment of the present invention relates to the order of providing an ink and a treatment liquid to a printing medium. In this embodiment, a treatment liquid is provided to a printing medium subsequently after a mixed ink, and subsequently after the treatment liquid, another mixed ink is provided to the same medium.

This embodiment is remarkably effective above all in enhancement of OD value and inhibition of "haze" or feathering from occurring. If a treatment liquid with a high penetrating rate is adopted and provided to a printing media in the order described above, more excellent fixing properties can be obtained.

The actions and effects of this embodiment described above are attributed to the following mechanism. That is, the amount of an ink is relatively small in the reaction between a first-provided mixed ink and a treatment liquid, so that the ink is less fluidized by the reaction, and then another ink is provided subsequently after the treatment liquid, since the viscosity of the first-provided ink has been increased to some extent by its reaction with the treatment liquid and the penetration of the ink and so on is in process, the ink as a whole becomes less fluidized.

(Treatment Liquid Selectivity)

Although the composition of a treatment liquid is as described above, in order to enjoy the effects produced by the present invention to the full, preferably a treatment liquid having an optimal composition is selected depending on the type and amount of the first and second pigments and the polymer dispersant contained in the ink. This point will be described below while showing specific examples.

An ink containing a first pigment of a self-dispersing carbon black having an anionic group bonded onto its surface, a second pigment of a commonly used carbon black, and a polymer dispersant of styrene-acrylic acid-ethyl acrylate copolymer (acid value of 180, average molecular weight of 12000); and a treatment liquid containing a low-molecular weight cationic compound of benzalkonium chloride (EBK) and a cationic polymer dispersant of polyallylamine (PAA) were prepared. While the ratio of EBK to PAA in the treatment liquid was fixed (PAA: 4%, EBK: 0.5%), the ratio of the self-dispersing carbon black to the commonly used carbon black in the ink was varied. An image was obtained at each ratio and its properties were evaluated (the amount of the polymer dispersant was varied depending on the variation in the amount of the commonly used carbon black).

Figure 7A:
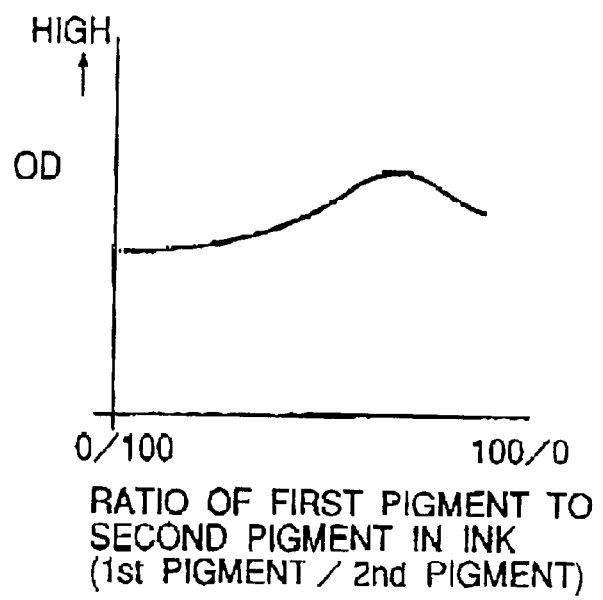
FIG. 7A is a graph roughly showing the change of OD of images in relation to the ratio of a first pigment to a second pigment in an ink.

Referring to FIG. 7A, there is shown a graph schematically illustrating the change in OD of the image obtained with change in ratio of the first pigment to the second pigment in the ink while fixing the composition of the treatment liquid. As seen from this graph, the image has the maximum OD value when the ratio of the first pigment to the second pigment has a certain value.

Figure 7B:
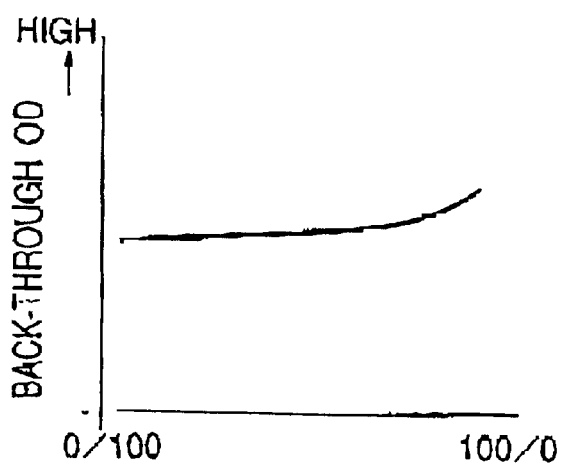
FIG. 7B is a graph roughly showing the change of back-through OD of images in relation to the ratio of a first pigment to a second pigment in an ink.

Referring to FIG. 7B, there is shown a graph schematically illustrating the change in OD of the image obtained, which was measured from the back side of the printing medium (back-through OD), with change in ratio of the first pigment to the second pigment in the ink while fixing the composition of the treatment liquid. It is clear that the ratio of the first pigment to the second pigment correlates with the back-though OD to a certain extent.

Figure 7C:
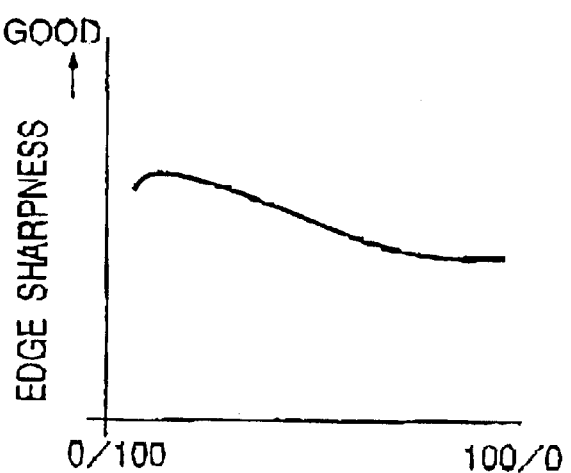
FIG. 7C is a graph roughly showing the change of edge sharpness of image dots in relation to the ratio of a first pigment to a second pigment in an ink.

Referring to FIG. 7C, there is shown a graph schematically illustrating the change in edge sharpness of the image obtained, which was visually observed, with change in ratio of the first pigment to the second pigment in the ink while fixing the composition of treatment liquid. It is clear that the image has the best edge sharpness when the ratio of the first pigment to the second pigment has a certain value.

A similar experiment was carried out while varying the ratio of EBK to PAA in the treatment liquid. As a result, it was found that, when increasing EBK, each of the above curves shifted to higher contents of the self-dispersing carbon black; and when increasing PAA, each of the curves shifted to higher contents of the carbon black dispersed by the polymer dispersant in the ink.

It is presumed from this fact that PAA and the carbon black dispersed by the polymer dispersant are closely related with each other and EBK and the self-dispersing carbon black are closely related with each other. This may be explained by the following hypothetical mechanism.

Figure 4B:
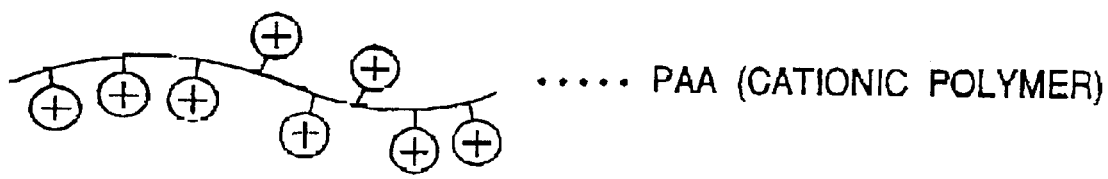
FIG. 4B is a hypothetical illustration of the molecule of a cationic self-dispersing pigment.
Figure 4C:
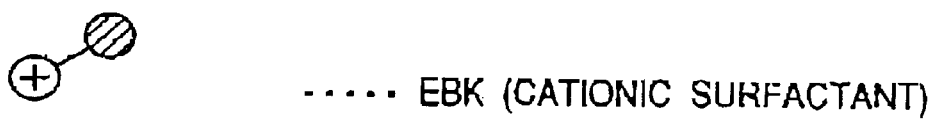
FIG. 4C is a hypothetical illustration of the molecule of a cationic surfactant.
Figure 5:
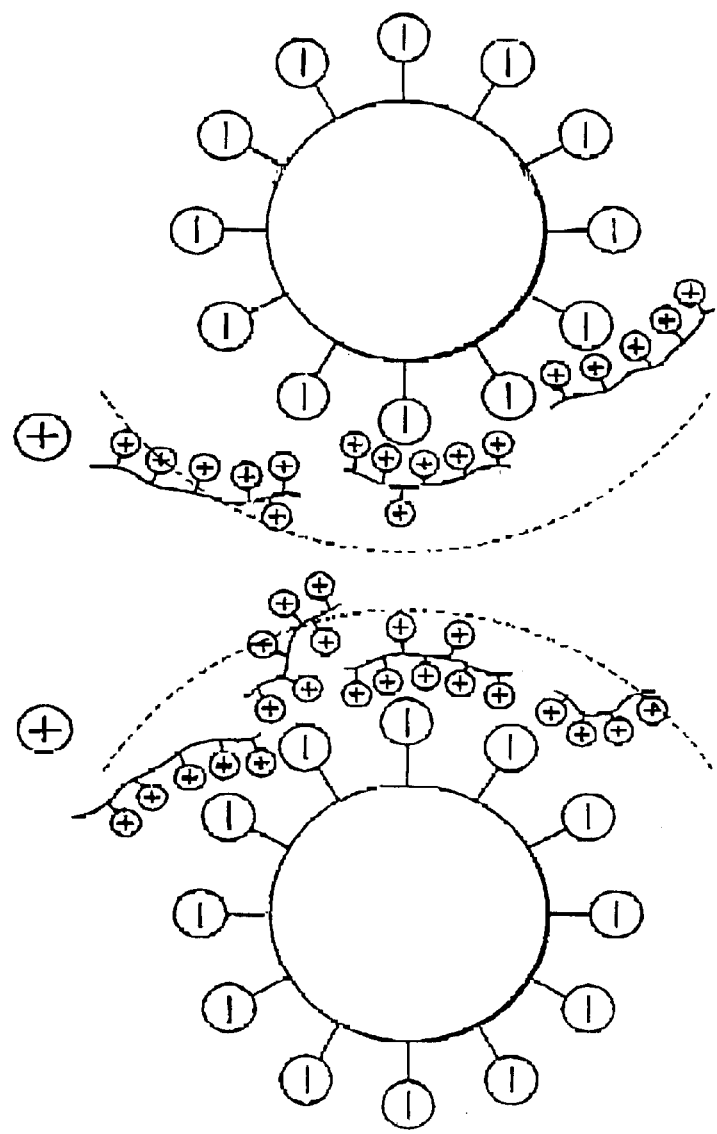
FIG. 5 is a schematic illustration presumably describing a reaction mode in a boundary of two anionic self-dispersing pigments between which a cationic polymer intervenes.

The self-dispersing carbon black is in the form schematically shown in FIG. 4A, as described above, and PAA, which is a cationic polymer, is in the form of a string having multiple cationic groups in one molecule, as shown in FIG. 4B. In cases where the treatment liquid contains only PAA, but not EBK, when the self-dispersing carbon black in the ink and PAA are mixed, the polymer PAA is twined around the self-dispersing carbon black as shown in FIG. 5. However, since it is difficult for the cationic groups of PAA to bond to every anionic group of the pigment for geometrical reasons, the self-dispersing carbon black to which PAA is bonded, as shown in FIG. 5, is cationic as a whole. In other words, the dispersibility of the pigment is not fully destroyed. And in a condition in which each fine pigment particle is surrounded with cationic groups, since electrical repulsion force acts stronger than intermolecular attraction, an aggregation of fine pigment particles is inhibited from being formed, which facilitates the pigment to penetrate into the printing medium rather than remain on the surface of the printing medium. As a result, the treatment liquid acts in such a way that the enhancement of OD and edge sharpness is obstructed. However, if EBK having the form shown in FIG. 4C exists in the treatment liquid, the reaction of the self-dispersing carbon black and PAA progresses competitively with the reaction of the self-dispersing carbon black and EBK; consequently, the production of the self-dispersing carbon black combined with PAA is decreased. On the other hand, for the second pigment, a polymer dispersant bonded onto the surface thereof and PAA become liable to twine around each other. As a result, the dispersibility of the pigment in the ink is fully destroyed, which facilitates the pigment to remain on the surface of the printing medium. Thus OD and edge sharpness are enhanced.

To be more concrete, when combining an ink containing a self-dispersing carbon black and a carbon black to be dispersed by a polymer dispersant at a ratio of 1:1 and a treatment liquid containing polyallylamine and benzalkonium chloride at a ratio of (PAA: 3.6%, EBK: 0.5%) and having a high penetrability, an image excellent in fixing properties and especially in edge sharpness can be obtained.

Further, when combining an ink containing a self-dispersing carbon black and a carbon black to be dispersed by a polymer dispersant at a ratio of 9:1 and a treatment liquid containing polyallylamine and benzalkonium chloride at a ratio of (PAA: 0%, EBK: 4%) and having a high penetrability, an image having both high-speed fixing properties and excellent image quality can be obtained. The reason why this embodiment enables both high-speed fixing property and high image quality are that the thickness of an ink dot on the printing medium can be decreased, the treatment liquid contains no polymer compound, and that the viscosity of the reaction liquid is low since the ink contains a polymer dispersant in only a small amount.

Embodiment 2

While the present invention has been described mostly in its preferred form which uses an ink containing first and second pigments in the first embodiment, it is to be understood that the form which uses different types of inks containing first and second pigments, respectively, is also embraced by the present invention.

Embodiment 2-1

In this embodiment, a first ink containing a first pigment, a second ink containing a second pigment, and a treating liquid which reacts with both the first and the second ink are provided onto the surface of a printing medium in such a manner that they come in contact with each other in a liquid state. When providing them to the printing medium, preferably at least one of the first and the second ink is provided before the treatment liquid is done. This enables various effects equivalent to those of the embodiment of the present invention described above.

There are four combinations to indicate the order of the two inks and the liquid treatment.

(1) First ink—Second ink—Treatment liquid
(2) Second ink—First ink—Treatment liquid
(3) First ink—Treatment liquid—Second ink
(4) Second ink—Treatment liquid—First ink

EXAMPLES

Examples of the present invention will be described in detail with reference to the drawings. It is to be understood that the present invention is not limited to these specific examples, and that it is capable of covering other examples such as the combinations thereof and of being applied to other technical fields involved in the similar problems.

Example 1-1

Figure 8:
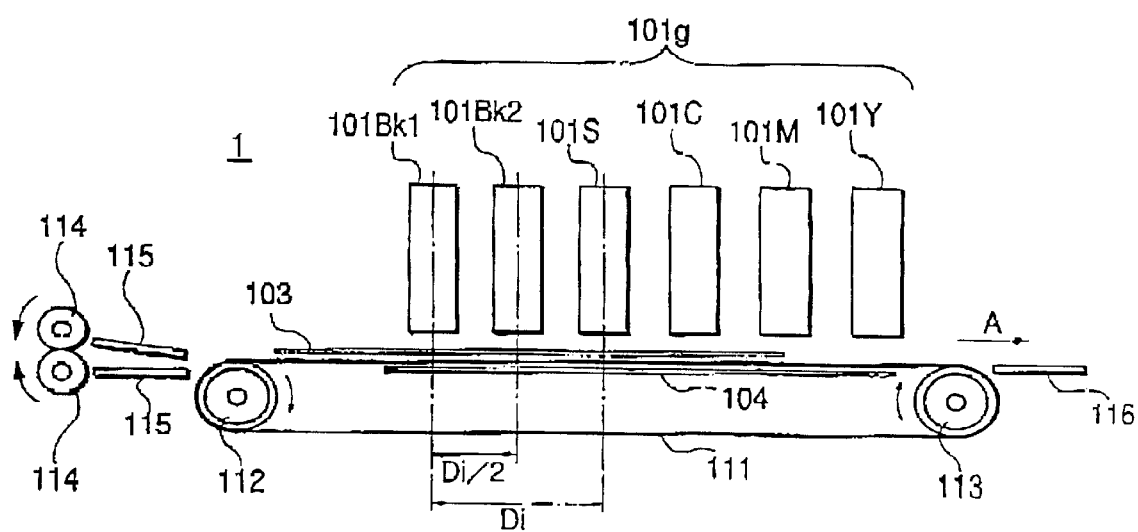
FIG. 8 is a side view of the schematic configuration of a printing apparatus relevant to one embodiment of the invention.

Referring to FIG. 8, there is shown a side view schematically illustrating a full line type printing apparatus according to the first example of the present invention.

This printing apparatus 1 adopts an ink-jet printing method in which printing is carried out by ejecting an ink or a treating liquid from multiple full line type print heads (ejecting portions) arranged in prescribed positions toward the direction in which a recording medium as a printing medium is conveyed (in the direction shown by the arrow A in the figure). It operates under control of a control circuit shown in FIG. 9 described later.

Each print head 101Bk1, 101Bk2, 101S, 101C, 101M and 101Y of a head group 101g has about 7200 ink-ejecting ports arranged in the transverse direction of a recording paper 103 (in the direction perpendicular to the sheet showing the figure) conveyed in the direction shown by the arrow A in the figure. The printing apparatus can perform printing on a recording paper to a maximum size of A3.

The recording paper 103 is conveyed in the direction A with the aid of rotation of a pair of resist rollers 114 which is driven by a conveyance motor, guided by a pair of guide plates 115 so as to register its tips, and conveyed by a conveyance belt 111. The conveyance belt 111 which is an endless belt is held by two rollers 112 and 113, and the displacement in vertical direction of its upper side portion is regulated by a platen 104. When the roller 113 is rotationally driven, the recording paper is conveyed. The recording paper 113 is held to the conveyance belt 111 by electrostatic holding. The roller 113 is rotationally driven by a driving source, such as a motor, not shown in the figure in such a direction that the recording paper 103 is conveyed in the direction shown by the arrow A. The recording paper 103 having been subjected to recording while being conveyed on the conveyance belt 111 is delivered onto a stocker 116.

Print heads of a recording head group 101g consisting of two heads 101Bk1 and 101Bk2 for ejecting a black ink, a head 101S for ejecting a treatment liquid and heads for ejecting color inks (a cyan head 101C, a magenta head 101M and an yellow head 101Y), described in the above embodiment 1, are arranged in the direction A in which the recording paper 103 is conveyed. Print of black letters and color images are made possible by ejecting each colored ink and the treatment liquid from each print head.

Figure 9:
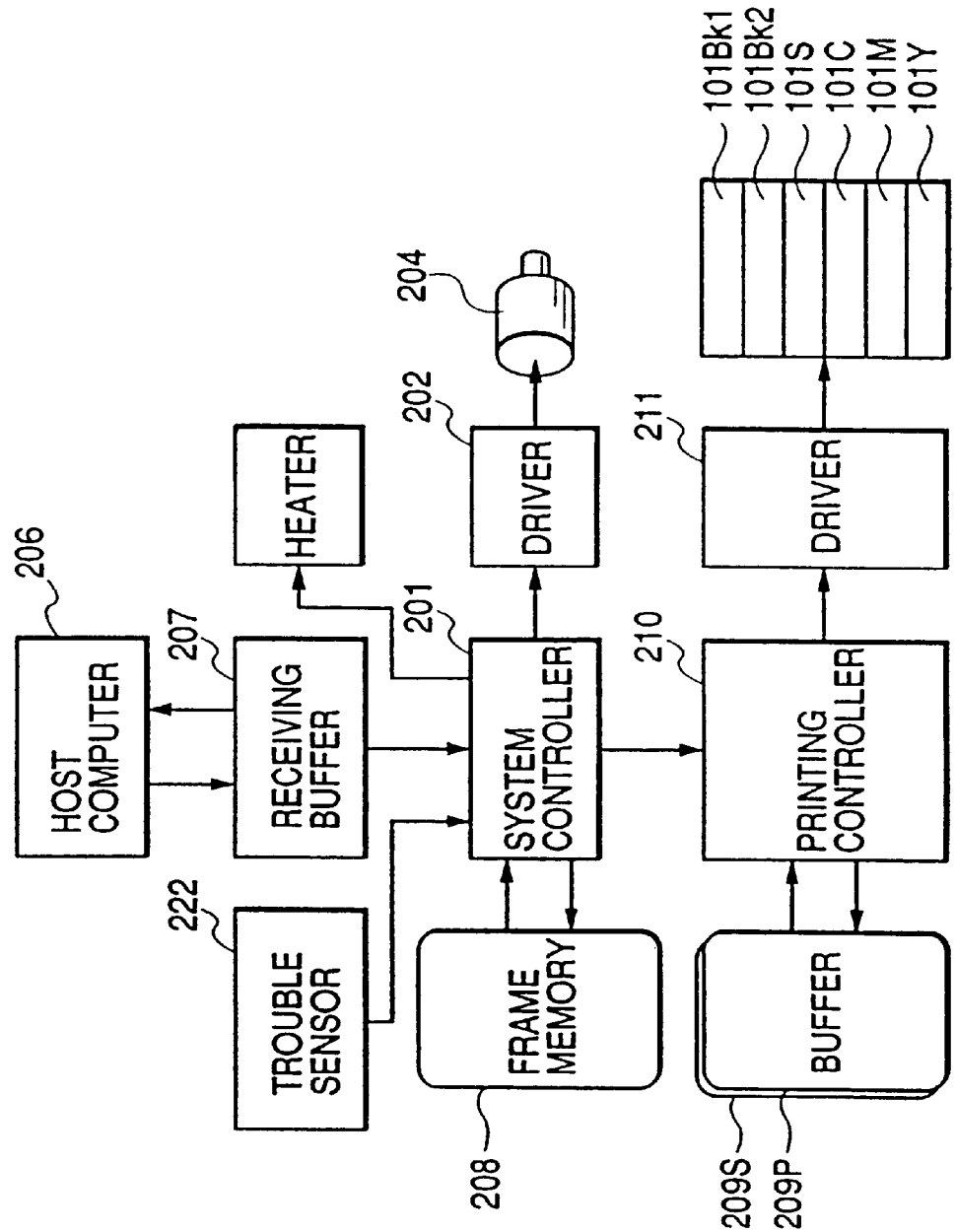
FIG. 9 is a block diagram showing the control system of the printing apparatus described in FIG. 8.

Referring to FIG. 9, there is shown a block diagram illustrating a control system of the full line type printing apparatus 1 of FIG. 8.

A system controller 201 includes a microprocessor, ROM for storing a control program executed in this apparatus and RAM used as a work area when the microprocessor performs processing, and controls the entire apparatus. A motor 204 rotates the roller 113 shown in FIG. 8 to convey recording paper while its drive is being controlled via a driver 202.

A host computer 206 transfers the information to be printed to the printing apparatus 1 of this embodiment and controls the printing operation. A receiving buffer 207 temporarily stores the data from the host computer 206 until the system controller 201 reads the data. A frame memory 208 is a memory for expanding the data to be printed to image data and has a memory size required for printing. Although the frame memory 208 is described as being capable of storing data for a sheet of recording paper in this embodiment, the present invention is not intended to be limited to a specific memory capacity.

Buffers 209S and 209P temporarily store the data to be printed, and their storage capacity varies depending on the number of ejecting ports of print heads. A printing controller 210 is provided for properly controlling the drive of print heads under the command from the system controller 201 and controls drive frequency, the number of printing data, etc., and in addition, creates data for ejecting a treatment liquid. A driver 211 drives the print head 101S for ejecting the treatment liquid as well as the print heads 101Bk1, 101Bk2, 101C, 101M and 101Y for ejecting their respective inks and is controlled by the signal from the printing controller 210.

In the above system, print data are transferred from the host computer 206 to the receiving buffer 207 to be temporarily stored. The print data stored in the receiving buffer 207 is read by the system controller 201 and expanded to the buffers 209S and 209P. And paper jam, out-of-ink, out-of-paper, etc. can be detected by various detection signals from a trouble sensor 222.

The printing controller 210 creates liquid treatment data for ejecting the liquid treatment based on the image data expanded to the buffers 209S and 209P. It also controls the ejection operation of each print head based on the print data in the buffers 209S and 209P and the liquid treatment data.

In this embodiment, an ink with a low penetrating rate (hereinafter referred to as an over-coating type ink) was used as the black ink ejected from the heads 1011Bk and 101Bk2, a treatment liquid and inks both with a high penetrating rate (hereinafter referred to as highly-permeable ink) were used as the treatment liquid and each of the cyan, magenta and yellow inks.

The composition of the treatment liquid and each ink used in this embodiment are as follows. The ratio of each ingredient is shown in parts by weight.

[Treatment Liquid]

| | |
|---|---|
| glycerol | 7 parts |
| diethylene glycol | 5 parts |
| Acetylenol EH (from Kawaken Fine Chemicals Co., Ltd.) | 2 parts |
| polyallylamine (molecular weight: 1500 or less, average: about 1000) | 4 parts |
| acetic acid | 4 parts |
| benzalkonium chloride | 0.5 parts |
| triethylene glycol monobutyl ether | 3 parts |
| water | the rest |

[Yellow (Y) Ink]

| | |
|---|---|
| C.I. Direct Yellow 86 | 3 parts |
| glycerol | 5 parts |
| diethylene glycol | 5 parts |
| Acetylenol EH (from Kawaken Fine Chemicals Co., Ltd.) | 1 part |
| water | the rest |

[Magenta (M) Ink]

| | |
|---|---|
| C.I. Acid Red 289 | 3 parts |
| glycerol | 5 parts |
| diethylene glycol | 5 parts |
| Acetylenol EH (from Kawaken Fine Chemicals Co., Ltd.) | 1 part |
| water | the rest |

[Cyan (C) Ink]

| | |
|---|---|
| C.I. Direct Blue 199 | 3 parts |
| glycerol | 5 parts |
| diethylene glycol | 5 parts |
| Acetylenol EH (from Kawaken Fine Chemicals Co., Ltd.) | 1 part |
| water | the rest |

[Black (Bk) Ink]

| | |
|---|---|
| pigment dispersion 1 | 25 parts |
| pigment dispersion 2 | 25 parts |
| glycerol | 6 parts |
| diethylene glycol | 5 parts |
| Acetylenol EH (from Kawaken Fine Chemicals Co., Ltd.) | 0.1 parts |
| water | the rest |

The Ka value of this black ink was 0.33. The pigment dispersions 1 and 2 described above are as follows.

[Pigment Dispersion 1]

10 g of carbon black with a surface area of 230 m$^2$/g and a DBP oil absorption of 70 ml/100 g and 3.41 g of p-aminobenzoic acid were fully mixed in 72 g of water, then 1.62 g of nitric acid was added dropwise and stirred at 70° C. After several minutes, a solution of 1.07 g of sodium nitrite in 5 g of water was added and stirred for additional 1 hour. The slurry obtained in this manner was filtered with Toyo filter paper No. 2 (from Advantice Co., Ltd.), and its pigment particles were fully water-washed, followed by drying in an oven at 90° C. Then water was added to the pigment to prepare a 10 wt % pigment aqueous solution. Thus, a pigment dispersion was obtained in which an anionically charged self-dispersing carbon black having a hydrophilic group bonded onto its surface via a phenyl group, as shown by the following formula, was dispersed.

[Chemical Formula 4]

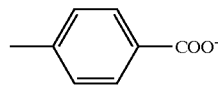

[Pigment Dispersion 2]

The pigment dispersion 2 was prepared as follows. 14 parts of styrene-acrylic acid-ethyl acrylate copolymer (acid value of 180, average molecular weight of 12000), as a dispersant, 4 parts of monoethanolamine and 72 parts of water were mixed. And the mixture was heated to 70° C. in a water bath to completely dissolve the resin content. Resin cannot sometimes be completely dissolved if its content is low. Accordingly, when intending to dissolve resin, a solution with a desired resin content may be prepared by diluting the solution with a high resin content previously prepared. To this solution added was 10 parts of carbon black (brand name: MCF-88, pH 8.0, from Mitsubishi Chemical Industries Ltd.), which is dispersible in an aqueous solution only with the aid of the action of a dispersant, and the solution was subjected to premixing for 30 minutes. Then the following operation was carried out to obtain the pigment dispersion 2 in which the carbon black (MCF-88) was dispersed in an aqueous medium with the aid of a dispersant.

Disperser: Side Grinder
  (Igarashi Machine Industry Co., Ltd.)
Grinding medium: zirconia beads with a 1 mm diameter
Packing of grinding medium: 50% (by volume)
Grinding duration: 3 hours
Centrifuging (12000 RPM, 20 minutes)

Then is conducted the reaction of an ink containing a self-dispersing carbon black, a carbon black dispersible with the aid of a polymer dispersant and a polymer dispersant, which are mixed with each other to be dispersed; with a treatment liquid containing two cationic compounds (polyallylamine, benzalkonium chloride) which are different from the above ink in polarity, using the black ink according to the example described above.

In this example, ink-ejecting ports of each print head were arranged at a density of 600 dpi, and printing was carried out at a dot density of 600 dpi in a direction of the conveyance of the recording paper. Accordingly, the dot density of a printed image etc. in this example is 600 dpi in both row and column The ejecting frequency of each head was 4 KHz, accordingly the conveyance rate of recording paper is about 170 mm/sec. The distance Di between the head 101Bk1 for ejecting a mixed ink and the head 101S for ejecting a treatment liquid (see FIG. 8) is 80 mm, accordingly the time interval from the instance of ejecting the black pigment ink to the instance of ejecting the treatment liquid is about 0.48 sec.

The ejecting amount of each print head is 15 pl (picoliter) per ejection except Bk heads, and that of each Bk head was about 10 pl per ejection. Accordingly, when using two Bk heads, Bk1 and Bk2, the amount of ink provided per pixel was about 20 pl. When additional experiments were carried out in which the time interval from the instance of ejecting the black ink Bk to the instance of ejecting the treatment liquid was decreased to the minimum of 0.1 sec, similar results were obtained.

Example 1-2

An experiment was carried out in the same manner as in the above examples 1-1, except that the composition of each of the treatment liquid and the black ink was changed as follows.

[Treatment Liquid]

| | |
|---|---|
| glycerol | 7 parts |
| diethylene glycol | 5 parts |

-continued

| | |
|---|---|
| Acetylenol EH | 2 parts |
| (from Kawaken Fine Chemicals Co., Ltd.) | |
| benzalkonium chloride | 4 parts |
| triethylene glycol monobutyl ether | 3 parts |
| water | the rest |
| [Black (Bk) Ink] | |
| pigment dispersion 1 | 45 parts |
| pigment dispersion 2 | 5 parts |
| glycerol | 6 parts |
| diethylene glycol | 5 parts |
| Acetylenol EH | 0.1 parts |
| (from Kawaken Fine Chemicals Co., Ltd.) | |
| water | the rest |

The Ka value of this black ink was 0.33.

Example 1-3

An experiment was carried out in the same manner as in the above examples 1-1, except that the composition of each of the treatment liquid and the black ink was changed as follows.

| | |
|---|---|
| [Treatment Liquid] | |
| glycerol | 7 parts |
| diethylene glycol | 5 parts |
| Acetylenol EH | 2 parts |
| (from Kawaken Fine Chemicals Co., Ltd.) | |
| polyallylamine | 0.5 parts |
| (molecular weight: 1500 or less, average: about 1000) | |
| acetic acid | 0.5 parts |
| benzalkonium chloride | 4 parts |
| triethylene glycol monobutyl ether | 3 parts |
| water | the rest |
| [Black (Bk) Ink] | |
| pigment dispersion 1 | 45 parts |
| pigment dispersion 2 | 2.5 parts |
| C.I. Food Black 2 | 0.25 parts |
| glycerol | 6 parts |
| diethylene glycol | 5 parts |
| Acetylenol EH | 0.1 parts |
| (from Kawaken Fine Chemicals Co., Ltd.) | |
| water | the rest |

The Ka value of this black ink was 0.33.

Comparative Example 1

For comparison, an ink having the following composition was prepared using only the pigment dispersion 2 prepared in the same manner as in the example 1-1, but not using the pigment dispersion 1. Then printing was carried out under the same conditions as in the example 1-1. In this comparative example, no treatment liquid was used.

| | |
|---|---|
| pigment dispersion 2 | 50 parts |
| ethylene glycol | 8 parts |
| glycerol | 5 parts |
| isopropyl alcohol | 4 parts |
| water | the rest |

Comparative Example 2

Printing was carried out, using the ink prepared in the same manner as in the comparative example 1, except that heads whose ink-ejecting amount was about 15 pl per ejection were used for Bk1 and Bk2 heads and an ink-providing amount per pixel was 30 pl.

Evaluation results for each printed matter obtained in the above examples 1-1 to 1-3 and the above comparative examples 1 and 2 are shown in Table 2 below.

TABLE 2

| | Example 1-1 | Example 1-2 | Example 1-3 | Comparative Example 1 | Comparative Example 2 |
|---|---|---|---|---|---|
| OD | 1.45 | 1.48 | 1.45 | 1.10 | 1.35 |
| Occurrence of Water Resistance | within several seconds | within several seconds | within several seconds | about 1 hour | about 1 hour |
| Fixing Property | 2 sec. | 1 sec. | 1.5 sec. | 20 sec. | 40 sec. |
| Feathering (Occurrence of Haze) | A | A | A | A | A |
| Edge Sharpness of Solid Portion | A | A | A | C | C |

In the examples and comparative examples above, a predetermined image was printed on PB paper from Canon Inc. to measure their respective OD values. With regard to the evaluation items in Table 2, "OD" was measured with a Macbeth transmission reflection densitometer; "Occurrence of Water Resistance" means the time from the instance of completing printing to the instance from which almost no collapse in the printed image can be observed when water Is dropped thereon; and "Fixing Property" means the time from the instance of completing printing to the instance from which almost no back stain can be observed. With regard to "Feathering", the occurrence of "haze" and feathering around the dots was observed with a magnifying glass; when none of them was observed, the printing was evaluated as "A", and when any of them was observed, the printing was evaluated as "B".

With regard to "Edge Sharpness of Solid Portion", the edge portion of the solid line image was observed with a magnifying glass; when the edge formed a fine straight line, the printing was evaluated as "A", when the straight line of the edge was marred to such an extent that it was practically permissible, the printing was evaluated as "B", and when the straight line of the edge was lost, the printing was evaluated as "C".

As seen from Table 2, the systems of the examples of the present invention can provide excellent printed matter compared to the cases where the conventional pigment-based ink was used, especially in OD value, occurrence of water resistance and fixing properties.

With regard to OD value, in the examples of the present invention in which a liquid treatment is provided to an ink containing a pigment requiring no dispersant, a pigment to be dispersed with the aid of a dispersant and a polymer dispersant in a mixed state, high OD values can be obtained compared with the cases where a liquid treatment is provided to an ink containing a pigment alone or a dye alone, because mixing the above pigments and treatment liquid produces the aforementioned effects.

In terms of the ability of inhibiting feathering ("haze" and "bleeding") from occurring and giving the sharpness of the edge portion, evaluation was made while varying the time from the instance of ejecting an ink from the head 101Bk to the instance of ejecting a treatment liquid from the head 101S. Results show the examples of the present invention are superior to the comparative examples.

Even when the time from the instance of ejecting an ink from the head 101Bk to the instance of ejecting a treatment liquid from the head 101S was set to 0.1 second, almost the same results were obtained.

The full multi-type printing apparatus described above is especially suitable for high-speed printing, because its print heads are used in a fixed state during the printing operation and the time required for conveying recording paper is almost the same as the time required for printing. Thus, when applying the present invention in such printing apparatus, its high-speed printing function can be further enhanced and printing of higher quality, that is, printing with a higher OD value and free from bleeding and haze is made possible.

The printing apparatus of the present invention is most generally used as a printer; however, it goes without saying that it can be used as a printing portion of copying machines, facsimiles, etc.

Although the effects of the examples of the present invention have been described with reference to Table 2 using the construction in which two heads are used for the black mixed ink, it is to be understood that the present invention is not limited to this specific example. The construction in which one head is used for the black mixed ink and the ink-ejection amount is set to 20 pl can also produce the same effects.

Example 2

Figure 10:
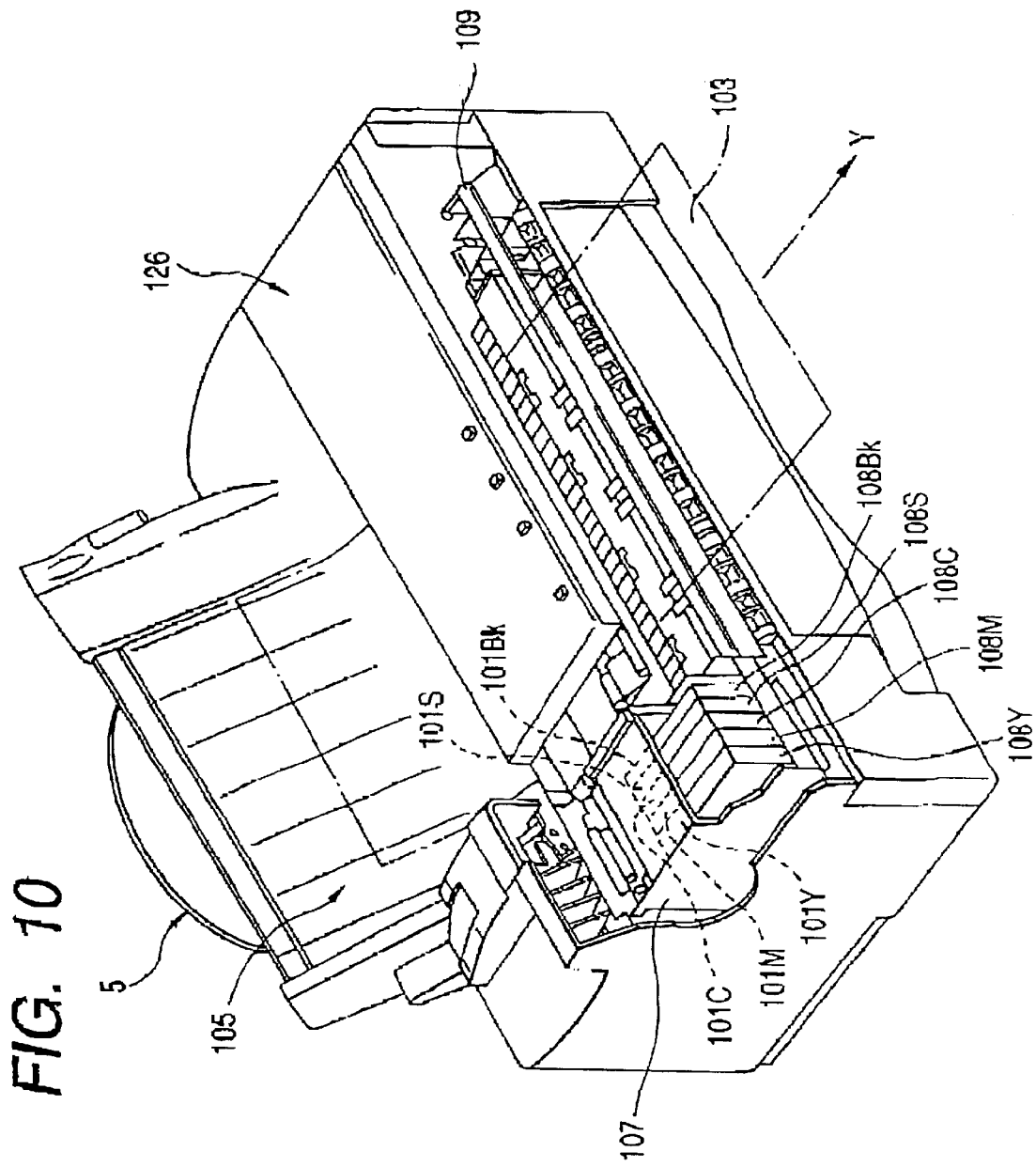
FIG. 10 is a diagonal view showing the configuration of a printing apparatus relevant to another embodiment of the invention.

Referring now to FIG. 10, there is shown a schematic perspective view illustrating a construction of a serial type printing apparatus 5 according to the second example of the present invention. It is apparent that the printing apparatus in which a treatment liquid is provided subsequently after an ink is provided to a printing medium so as to react them with each other is applicable not only to the aforementioned full line-type printing apparatus, but also to a serial type printing apparatus. In FIG. 10, the elements equal to those shown in FIG. 8 are denoted by the same reference numeral as in FIG. 8 and their detailed descriptions are omitted.

A recording paper 103, as a printing medium, is inserted into a paper-supplying portion 105 and delivered via a printing portion 126. In this example, plain paper, inexpensive and commonly and widely used, is employed as the recording paper 103. In the printing portion 126, a carriage 107 is constructed to contain print heads 101Bk, 101S, 101C, 101M and 101Y and be able to do a reciprocating motion along a guide rail 109 with the aid of the driving force of a motor, which is not shown in the figure. The print head 101Bk is for ejecting a black mixed ink described in the aforementioned embodiment. The print heads 101S, 101C, 101M and 101Y are for ejecting a treatment liquid, cyan ink, magenta ink and yellow ink, respectively; and they are driven to eject their respective inks to the recording paper 103 in the above order.

Each head is fed with an ink or a treatment liquid from each corresponding tank 108Bk, 108S, 108C, 108M or 108Y. When the ink is to be ejected, each electrical heat transducer, that is, heater provided for each ejection port of each head is fed with a driving signal, so as to apply heat energy to the ink or the treatment liquid to allow it to generate bubbles. With the aid of the pressure of these bubbles, the ink or the treatment liquid is ejected from its head. Each head includes 64 ejection ports at a density of 360 dpi which are arranged in almost the same direction Y to convey the recording paper 103, in other words, in the direction almost perpendicular to the scanning direction of each head. The ejection amount of each ejection port is 25 pl.

In the above construction, the distance between the heads is ½ inch, accordingly the distance between the head 101Bk and the head 101S is 1 inch. And printing density is 720 dpi in the scanning direction and the ejection frequency of each head is 7.2 KHz. Accordingly, the time from the instance of ejecting the pigment-based ink from the head 101Bk to the instance of ejecting the treatment liquid from the head 101S is 0.05 sec.

Figure 11C:
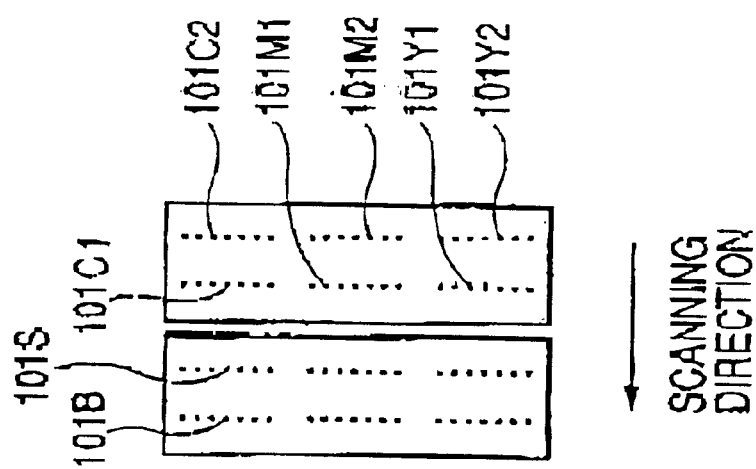
FIGS. 11A, 11B and 11C are schematic illustrations showing the head configuration of a printing apparatus relevant to another embodiment of the invention.
Figure 11B:
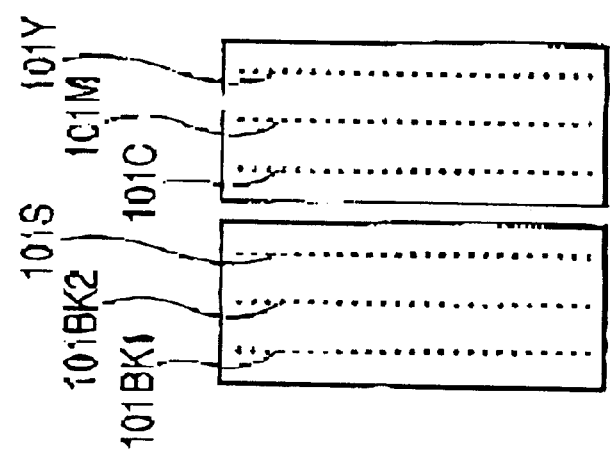
Figure 11A:
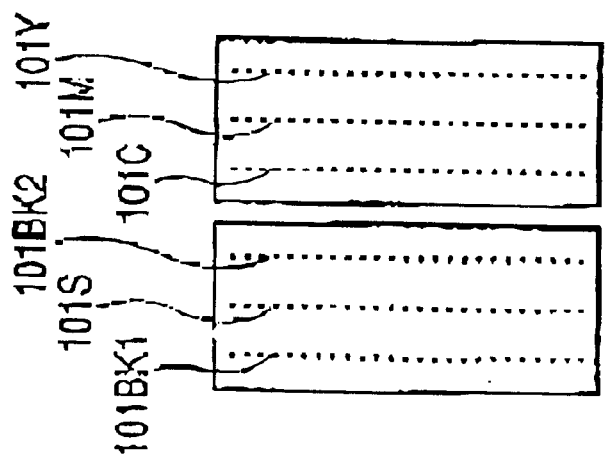

Referring to FIGS. 11A to 11C, there are shown three other examples of a head construction in a serial type printing apparatus as shown in FIG. 10, schematically illustrating the ejection port arrangement.

As shown in FIG. 11A, the construction may be such that it has two ejection portions for ejecting a black ink (ejection portions 101Bk1, 101Bk2) and an ejection portion 101S for ejecting a treatment liquid arranged between the above two ejection portions. In this case, the treatment liquid is provided subsequently after the black ink is provided to a printing medium and another black ink is provided to the same printing medium subsequently after the treatment liquid is provided.

Each of the head constructions shown in FIGS. 11A, 11B and 11C consists of several ink heads or treatment liquid heads integrally formed together. In such an integrally formed head unit, it goes without saying that, ejection ports and liquid rooms in communication therewith are separated from each other for each of the inks and treatment liquid. Accordingly, each ejection portion functions in the same way as each ink or treatment liquid head.

FIG. 11B shows another example of the construction having two ejection portions for ejecting a black ink like the example shown in FIG. 11A. The ejection portions 101Bk1 and 101Bk2 are arranged in such a manner that the black ink is ejected from both ejection portions 101Bk1 and 101Bk2 before a treatment liquid is ejected. According to this construction, the treatment liquid is provided after two droplets of the black ink are provided to a printing medium.

FIG. 11C shows a construction which is the same as the example shown in FIG. 10 in the arrangement and the number of the ejection portions 101B for ejecting a black ink and the ejection portions 101S for ejecting a treatment liquid, but is different from that in the arrangement of the ejection portions for ejecting C, M and Y inks. In the construction, two ejection portions are provided for each C, M and Y ink (ejection portions 101C1, 101C2, ejection portions 101M1, 101M2, and ejection portions 101Y1, 101Y2) and the ejection portions, 101C1, 101M1, and 101Y1; 101C2, 101M2 and 101Y2 are arranged in the direction perpendicular to the scanning direction. In this head construction, each C, M and Y ink is piled up after multiple times of scanning, while conveying recording paper between the subsequent scanning operations. From each of the two different ejection portions provided for each ink, an ink different in brightness is ejected.

In the construction having two ejection portions for ejecting a black ink, as shown in FIGS. 11A and 11B, the ratio of a first pigment to a second pigment contained in the ink ejected from the two different ejection portions are the same. However, the ratio may be different from each other. For example, the ratio of the first pigment to the second pigment may be (1:1) in the ink ejected from the ejection portion 101Bk1 and (9:1) in the ink ejected from the ejection portion 101Bk2 and vice versa.

Example 3

In another example of the present invention, print heads or ejection portions are arranged, for example, as shown in FIG. 11A. In further detail, in FIG. 11A, a black ink is ejected from the ejection portions 101Bk1 and 101Bk2 and a treatment liquid is ejected from the ejection portion 101S. Inks and a treatment liquid are ejected in order of ink, treatment liquid, and ink.

In this example, each ejection portion has ejection ports arranged at a density of 600 dpi and the ejection amount is about 15 pl each. The distance between the ejection portions is ½ inch just the same as in the above example 2. The ejection frequency is 10 KHz, print resolution is 600 dpi both in the transverse scanning direction and in the scanning direction. Accordingly, the time interval from the instance of ejecting an ink to the instance of ejecting a treatment liquid is 30 msec. In this example, the treatment liquid used contains 2% of Acetylenol and has a high penetrability.

According to the construction of the above example, in printing of black letters etc., OD values as high as about 1.5 or more can be obtained, the reaction product is hardly fluidized by the treatment liquid, and "haze" and feathering can be inhibited from occurring. In addition, since. a treatment with a high penetrability is used, as described above, better fixing properties can be realized.

Example 4

In another form of the examples shown in FIGS. 8 and 9 in which, instead of mixed ink, different inks each containing a first pigment and a second pigment are ejected independently, print heads of a recording head group 101g, a head 101Bk1 for ejecting a first black pigment-based ink, a head 101Bk2 for ejecting a second black pigment-based ink, a head 101S for ejecting a treatment liquid, and heads for ejecting colored inks (cyan head 101C, magenta head 101M and yellow head 101Y) are arranged in a direction of the conveyance of a recording paper 103 as shown in the figures. Black printed letters and color printed images can be obtained by ejecting each colored ink and treatment liquid from each ink head.

In this example, for the first black pigment-based ink and the second black pigment-based ink ejected from the heads 101Bk1 or 101Bk2, respectively, an over-coating type ink with a low penetrating rate is used, and for the treatment liquid and the cyan, magenta and yellow inks ejected from the respective heads 101S, 101C, 101M or 101Y, a treatment liquid with a high penetrability and highly-penetrable ink are used The compositions of the first and second black pigment-based inks and the treatment liquid used in this example are as follow.

| [Treatment Liquid] | |
| --- | --- |
| glycerol | 7 parts |
| diethylene glycol | 5 parts |
| Acetylenol EH | 2 parts |
| (from Kawaken Fine Chemicals Co., Ltd.) | |
| polyallylamine | 4 parts |
| (molecular weight: 1500 or less, average; about 1000) | |
| acetic acid | 4 parts |
| benzalkonium chloride | 0.5 parts |
| triethylene glycol monobutyl ether | 3 parts |
| water | the rest |
| [Black (Sk) First Pigment-based Ink] | |
| pigment dispersion 1 | 50 parts |
| glycerol | 6 parts |
| diethylene glycol | 5 parts |

| -continued | |
| --- | --- |
| Acetylenol EH | 0.1 parts |
| (from Kawaken Fine Chemicals Co., Ltd.) | |
| water | the rest |

The Ka value of this black ink was 0.33. The above pigment dispersions 1 and 2 are as follows:

| [Black (Bk) Second Pigment-based Ink] | |
| --- | --- |
| pigment dispersion 2 | 50 parts |
| ethylene glycol | 8 parts |
| glycerol | 5 parts |
| isopropyl alcohol | 4 parts |
| water | the rest |

With the first black pigment-based ink and the second black pigment-based ink according to the example of the present invention described above, there is conducted the reaction of the dispersed liquid mixture containing the first pigment, the second pigment and a polymer dispersant, all of which have the same polarity; with a treatment liquid containing compounds, which have the opposite polarity to that of the above liquid mixture.

The distance Di between the head 101Bk1 for ejecting the pigment-based ink and the head 101S for ejecting the treatment liquid (see FIG. 8) was 80 mm, accordingly the time interval from the instance of ejecting the first black pigment-based ink or the second black pigment-based ink to the instance of ejecting the treatment liquid was about 0.48 sec. The ejection amount of each print head was 15 pl per ejection except Bk heads, and that of each Bk head was about 10 pl per ejection. Accordingly, when producing a pixel using two Bk heads, Bk1 and Bk2, the amount of ink provided per pixel was about 20 pl, The printed matter obtained using the above apparatus and ink was evaluated in the same manner as in the above examples 1-1 to 1-3. Almost the same results as in the above examples were obtained.

Example 5

Figure 12:
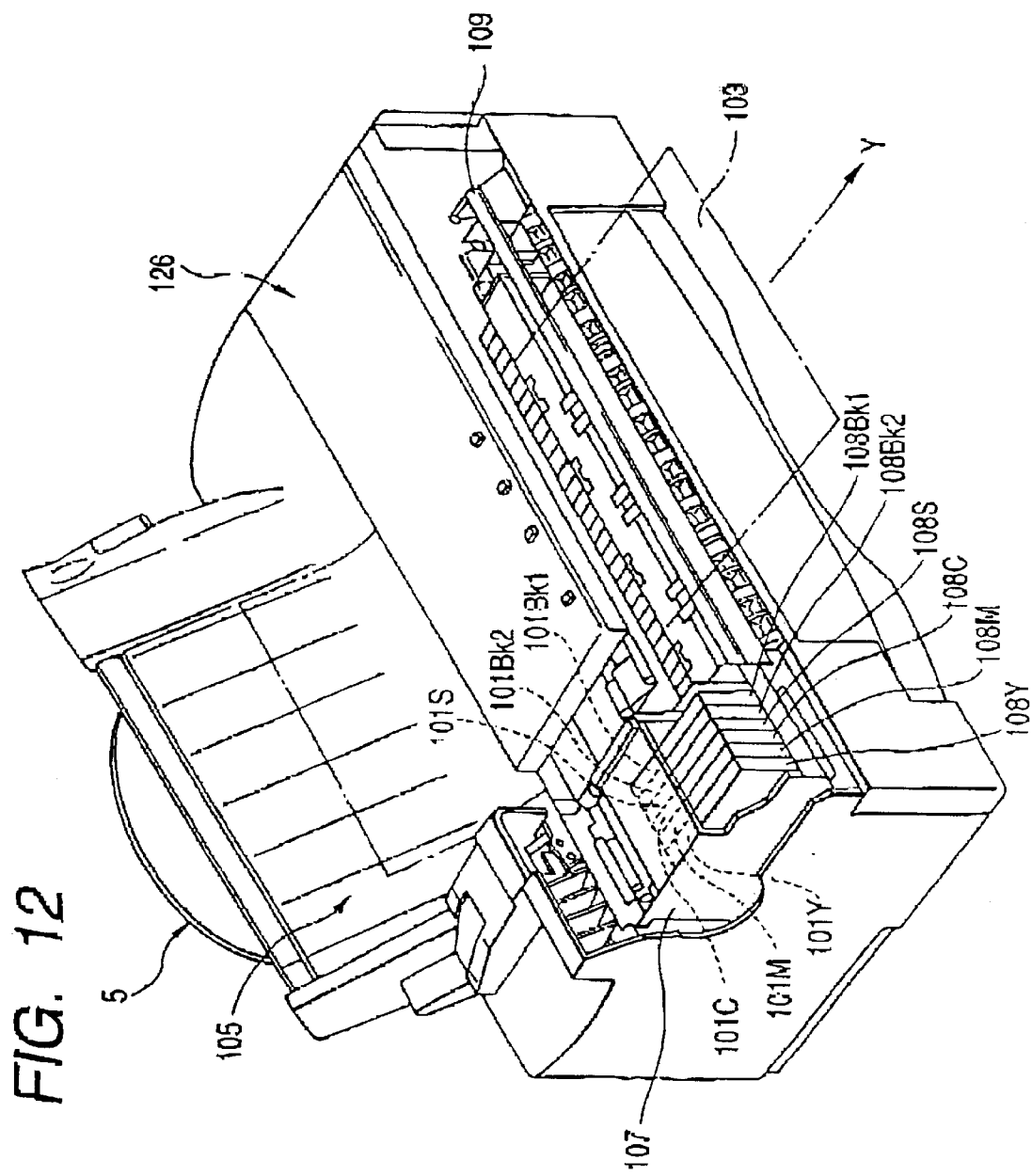
FIG. 12 is a diagonal view showing the configuration of a printing apparatus relevant to still another embodiment of the invention.

Referring to FIG. 12, there is shown a schematic perspective view illustrating a construction of a serial type printing apparatus 5 in which a first pigment-based ink and a second pigment-based ink are mixed with each other on a printing medium, subsequently after that, a treatment liquid is reacted with the mixed ink. It is apparent that the printing apparatus in which a treatment liquid is provided subsequently after the above two inks are mixed on a printing medium, so as to react them with each other is applicable not only to the aforementioned full line-type printing apparatus, but also to a serial type printing apparatus. In FIG. 12, the elements equal to those shown in FIG. 8 are denoted by the same reference numeral as in FIG. 8 and their detailed descriptions are omitted.

A recording paper 103, as a printing medium, is inserted into a paper-supplying portion 105 and delivered via a printing portion 126. In this example, plain paper inexpensive and commonly and widely used, is employed as the recording paper 103. In the printing portion 126, a carriage 107 is constructed to contain print heads 101Bk1, 101Bk2, 101S, 101C, 101M and 101Y and be able to do a reciprocating motion along a guide rail 109 with the aid of the driving force of a motor, which is not shown in the figure.

The print head 101Bk1 is for ejecting the first black pigment based ink and the print head 101Bk2 is for ejecting the second black pigment-based ink. The print heads 101S, 101C, 101M and 101Y are for ejecting a treatment liquid, cyan ink, magenta ink and yellow ink, respectively; and they are driven to eject their respective inks to the recording paper 103 in the above order.

Each head is fed with an ink or a treatment liquid from each corresponding tank 108Bk1, 108Bk2, 108S, 108C, 108M or 108Y. When the ink is to be ejected, each electrical heat transducer (heater) provided for each ejection port of each head is fed with a driving signal, so as to apply heat energy to the ink or the treatment liquid to allow it to generate bubbles. With the aid of the pressure of these bubbles, the ink or the treatment liquid is ejected from its head. Each head includes 64 ejection ports at a density of 360 dpi which are arranged in almost the same direction Y of the conveyance of the recording paper 103, in other words, In the direction almost perpendicular to the scanning direction of each head. The ejection amount of ejection ports for the Bk ink is 15 pl and the ejection amount of ejection ports for the treatment liquid and the ink other than the Bk ink is 23 pl.

In the above construction, the distance between the heads is ½ inch, accordingly the distance between the head 101Bk1 and the head 101S is 1 inch. And printing density is 720 dpi in the scanning direction and the ejection frequency of each head is 7.2 KHz. Accordingly, the time from the instance of ejecting the pigment-based ink from the head 101Bk1 to the instance of ejecting the treatment liquid from the head 101S is 0.1 sec.

Example 6

Another example of the present invention is such that, in a serial type ink-jet printing apparatus shown in FIG. 12, the order of arranging the print heads is changed, and according to the change, the order of providing the first pigment-based ink, the second pigment-based ink and the treatment liquid is also changed.

Specifically, in the apparatus shown in FIG. 12, the head 101Bk1 and the head 101Bk2 are arranged in this order (the other heads are arranged in the same manner as in the example 5), and the first black pigment-based ink, the treatment liquid and the second black pigment-based irk are ejected to a printing medium in this order. The distance between the heads and the ejection frequency of each head are the same as in the above example 2.

According to this example, the reaction product of the ink and the treatment liquid can be less fluidized and haze can be more effectively inhibited from occurring.

Although this example has been described in the case where the first black pigment-based ink and the second black pigment-based ink are ejected from the head 101Bk1 and the head 101Bk2, respectively, the second black pigment-based ink may be ejected from the head 101Bk1 and the first black pigment-based ink may be ejected from the head 101Bk2. This construction can achieve the same good results as described above.

According to the present invention, images having a high OD, excellent edge sharpness, and less back-through on a printing medium can be obtained by providing an ink which contains a first pigment, a second pigment and a polymer dispersant for dispersing the second pigment to a printing medium, and subsequently, applying a treatment liquid which reacts with the ink to the same printing medium, in such a manner that the above treatment liquid and the above ink are mixed with each other on the above printing medium in a liquid state. In addition, the use of the above process greatly improves the fixing rate and fixing properties of the currently used pigment-based ink, which have been considered as shortcomings.

Further, the use of ink with a low penetrating rate in the above process allows a relatively larger amount of coloring materials to remain on the surface portion of the printing medium, so that the OD value of the printed images can be increased, even when the time interval from the instance of providing the ink to the instance of providing the treatment liquid is relatively long to allow the time for penetrating into the printing medium. Furthermore, the use of an ink with a low penetrating rate in itself is effective in inhibiting what is called feathering from occurring.

Further, according to the present invention, "exudation" or "haze" is extremely effectively inhibited from occurring around the image dots.

In cases where a treatment liquid is provided subsequently after ink is provided to a printing medium, and subsequently after that, another ink is provided to the same, the enhancement in OD value and the inhibition of "haze" or feathering are especially noticeable. The use of a treatment liquid with a high penetrability here also provides relatively good fixing properties.

For the treatment liquid having a Ka value, according to the Bristow's method, of 5.0 $(ml/m^2 \cdot msec^{1/2})$ or more, its penetrating rate is relatively high, and its use can enhance the fixing rate of the ink.

Providing a first pigment-based ink, a second pigment based-ink and a treatment liquid in this order is effective in decreasing back-though.

In cases where a treatment liquid is provided subsequently after a first or a second ink is provided, and subsequently after that, the remaining ink is provided, in other words, a treatment liquid is provided between the operations of providing a first and a second ink, since the first and the second pigment and the treatment liquid are mixed with each other on the printing medium, the occurrence of phenomena such as "exudation" can be eased. As a result, a high-quality printing which produces a high OD value and excellent edge sharpness can be performed. The use of a treatment liquid with a relatively high penetrability allows the reaction product of the first and second inks and the treatment liquid to have a high penetrability, as a result the penetrating rate is increased as a whole. Thus fixing rate can be increased and high-speed printing can be realized.

What is claimed is:

1. An ink-jet printing apparatus applying an ink containing a pigment dispersed in an aqueous medium to a printing medium followed by applying a treatment liquid to react with the ink, said ink containing a first pigment selected from a self dispersing pigment having at least one anionic group bonded directly or through another atomic group to the surface of the first pigment and a self-dispersing pigment having at least one cationic group bonded directly or through another atomic group to the surface of the first pigment, a second pigment capable of being dispersed in an aqueous medium by a polymer dispersant, and at least one dispersant selected from a polymer dispersant having the same polarity as that of the group bonded to the surface of the first pigment and a non-ionic polymer dispersant; and said ink-jet printing apparatus comprising application means for applying the ink and the treatment liquid separately to a printing medium to mix the ink and the treatment liquid with each other in a liquid state on the printing medium.

2. An ink-jet printing apparatus applying an ink containing a pigment dispersed in an aqueous medium to a printing medium followed by applying a treatment liquid to react with the ink, said ink containing a first pigment selected from a self-dispersing pigment having at least one anionic group bonded directly or through another atomic group to the surface of the first pigment and a self-dispersing pigment having at least one cationic group bonded directly or through another atomic group to the surface of the first pigment, a second pigment capable of being dispersed in an aqueous medium by a polymer dispersant, at least one dispersant selected from a polymer dispersant having the same polarity as that of the group bonded to the surface of the first pigment and a nonionic polymer dispersant; and said ink-jet printing apparatus comprising application means for applying the ink and the treatment liquid separately to a printing medium to mix the ink and the treatment liquid with each other in a liquid state on the printing medium followed by applying the ink to the ink and the treatment liquid mixed on the printing medium to further mix therewith on the recording medium in a liquid state.

3. An ink-jet printing apparatus carrying out printing by ejecting an ink containing a pigment dispersed in an aqueous medium to a printing medium followed by ejecting a treatment liquid to react with the ink, using an ink-ejecting portion for ejecting the ink and a treatment-liquid-ejecting portion for ejecting the treatment liquid, said ink containing a first pigment selected from a self-dispersing pigment having at least one anionic group bonded directly or through another atomic group to the surface of the first pigment and a self-dispersing pigment having at least one cationic group bonded directly or through another atomic group to the surface of the first pigment, a second pigment capable of being dispersed in an aqueous medium by a polymer dispersant, and at least one dispersant selected from a polymer dispersant having the same polarity as that of the group bonded to the surface of the first pigment and a nonionic polymer dispersant; and said ink-jet printing apparatus comprising
at least one pigment-based-ink-ejecting portion for ejecting the ink in the ink-ejecting portion;
arrangement means for arranging the pigment-based-ink-ejecting portion and the treatment-liquid-ejecting portion in a prescribed relative position; and
control means for relatively moving the respective ejecting portions to the printing medium, and for having the respective ejecting portions eject the ink and the treatment liquid respectively so as to mix the ink and the treatment liquid on the printing medium.

4. The ink-jet printing apparatus according to any one of claims 1 to 3, wherein said anionic group is at least one selected from the group consisting of —COOM, —SO₃M —PO₃HM and —PO₃M₂
(wherein M independently represents hydrogen atom, an alkali metal, ammonium, or an organic ammonium).

5. The ink-jet printing apparatus according to any one of claims 1 to 3, wherein said cationic group is at least one selected from the following:

$-NH_3^+$, $-NR_3^+$, $-SO_2NH_2$, $-SO_2NHCOR$,

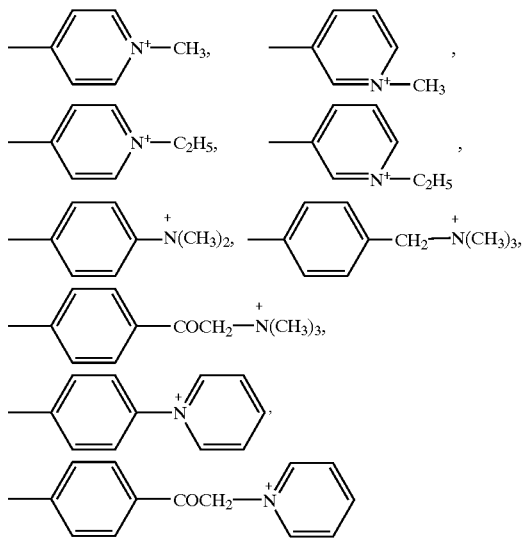

(In the formulas, R independently represents a linear branched alkyl group, a substituted or unsubstituted phenyl group, or a substituted or unsubstituted naphthyl group).

6. The ink-jet printing apparatus according to any one of claims 1 to 3, wherein said atomic group is selected from the group consisting of an alkyl having 1 to 12 carbon atoms, a phenyl group which may be substituted, and a naphthyl group which may be substituted.

7. The ink-jet printing apparatus according to any one of claims 1 to 3, wherein 80% or more particles of said first pigment has a particle diameter of 0.05 to 0.3 μm.

8. The ink-jet printing apparatus according to any one of claims 1 to 3, wherein 80% or more particles of said first pigment has a particle diameter of 0.1 to 0.25 μm.

9. The ink-jet printing apparatus according to any one of claims 1 to 3, wherein said second pigment is dispersed by adsorbing a polymer dispersant in the surface thereof.

10. The ink-jet printing apparatus according to any one of claims 1 to 3, wherein said polymer dispersant is at least one selected from the group consisting of a sulfonic acid type polymer dispersant and a carboxylic acid type polymer dispersant.

11. The ink-jet printing apparatus according to any one of claims 1 to 3, wherein said second pigment contains at least two pigments having different structures.

12. The ink-jet printing apparatus according to any one of claims 1 to 3, wherein the ratio of said first pigment to said second pigment is within the range from 5/95 to 97/3.

13. The ink-jet printing apparatus according to any one of claims 1 to 3, wherein the ratio of said first pigment to said second pigment is within the range from 10/90 to 95/5.

14. The ink-jet printing apparatus according to any one of claims 1 to 3, wherein the ratio of said first pigment to said second pigment is within the range from 9/1 to 4/6.

15. The ink-jet printing apparatus according to any one of claims 1 to 3, where n said first pigment is contained at a content higher than that of said second pigment.

16. The ink-jet printing apparatus according to any one of claims 1 to 3, wherein at least one of said first pigment and said second pigment is a carbon black.

17. The ink-jet printing apparatus according to any one of claims 1 to 3, wherein said ink further contains a dye with the same polarity as that of the group bonded to the surface of said first pigment.

18. The ink-jet printing apparatus according to claim 17, wherein the polarity of the group bonded to the surface of said first pigment is anionic, and said dye is an anionic dye.

19. The ink-jet printing apparatus according to claim 18, wherein said anionic dye is at least one selected from the group consisting of from an acidic dye, a direct dye, and a reactive dye.

20. The ink-jet printing apparatus according to claim 18, wherein said anionic dye has a skeletal structure selected from the group consisting of a disazo skeletal structure and trisazo skeletal structure.

21. The ink-jet printing apparatus according to any one of claims 1 to 3, wherein said treatment liquid contains a compound having at least one group with the polarity opposite to that of the group bonded to the surface of said first pigment.

22. The ink-jet printing apparatus according to any one of claims 1 to 3, wherein said treatment liquid contains a first compound having one group with the polarity opposite to that of the group bonded to the surface of said first pigment and a second compound having a plurality of groups with the polarity opposite to that of the group bonded to the surface of said first pigment.

23. The ink-jet printing apparatus according to claim 22, wherein said first compound is benzalkonium chloride and said second compound is polyallylamine.

24. The ink-jet printing apparatus according to claim 22, wherein the ratio of said first compound and said second compound in said treatment liquid is substantially optimized.

25. The ink-jet printing apparatus according to any one of claims 1 to 3, wherein said ink is a black ink.

26. The ink-jet printing apparatus according to claim 3, wherein said arrangement means arranges said pigment-based-ink-ejecting portion and said treatment-liquid-ejecting portion in this order in a prescribed direction and said control means causes the respective ejecting portion to eject said ink and said treatment liquid in this order to a printing medium to subsequently mix said ink and said treatment liquid.

27. The ink-jet printing apparatus according to claim 3, wherein said arrangement means comprises first and second pigment-based-ink-ejecting portions, and one treatment-liquid-ejecting portion, and said arrangement means arranges said first pigment-based-ink ejecting portion, said treatment-liquid ejection portion, and said second pigment-based-ink ejecting portion in this order in a prescribed direction, and said control means causes the respective ejecting portions to eject said pigment-based ink, said treatment liquid, and said pigment-based ink in this order to a printing medium to subsequently mix said pigment-based ink and said treatment liquid.

28. The ink-jet printing apparatus according to claim 3, wherein said arrangement means further arranges a cyan-ink-ejecting portion for ejecting a cyan ink, a magenta-ink-ejecting portion for ejecting a magenta ink, and a yellow-ink-ejecting portion for ejecting a yellow ink successively to the arrangement position of said pigment-based-ink-ejecting portion and said treatment-liquid-ejecting portion.

29. The ink-jet printing apparatus according to any one of claims 1 to 3, wherein said treatment liquid has a penetration rate of 5.0 $(ml/m^2 \cdot msc^{1/2})$ or higher as a Ka value measured by Bristow's method.

30. The ink-jet printing apparatus according to claim 3, wherein said pigment-based-ink-ejecting portion and said treatment-liquid-ejecting portion respectively comprise an ink-ejecting port and a treatment-liquid-ejecting port positioned in a range coresponding to the whole width of the printing region in a relatively moving printing medium.

31. The ink-jet printing apparatus according to claim 3, further comprising driving means for moving said pigment-based-ink-ejecting portion and said treatment-liquid-ejecting portion with respect to a printing medium while keeping the positioning relation of said pigment-based-ink-ejecting portion and said treatment-liquid-ejecting portion arranged by said arrangement means, wherein said control means controls said driving means to scan the respective ejecting portions with respect to a printing medium, thereby conducting the relative movement.

32. The ink-jet printing apparatus according to claim 3, wherein said pigment-based-ink-ejecting portion and said treatment-liquid-ejecting portion generate bubbles in a mixed ink and a treatment liquid, respectively, by utilizing heat energy, thereby ejecting the mixed ink and the treatment liquid, respectively, by the pressure of the bubbles.

33. The ink-jet printing apparatus according to claim 29, wherein said pigment-based ink has a penetration rate of less than 1.0 $(ml/m^2 \cdot msc^{1/2})$ as a Ka value measured by Bristow's method.

34. An ink-jet printing apparatus applying an ink containing a coloring material to a printing medium followed by applying a treatment liquid to make the coloring materials of the ink insoluble, said ink containing a first ink containing a first pigment selected from a self-dispersing pigment having at least one anionic group bonded directly or through another atomic group to the surface of the first pigment and a self-dispersing pigment having at least one cationic group bonded directly or through another atomic group to the surface of the first pigment, and a second ink containing a second pigment capable of being dispersed in an aqueous medium by a polymer dispersant and at least one dispersant selected from a polymer dispersant having the same polarity as that of the group bonded to the surface of the first pigment and a nonionic polymer dispersant, and said ink-jet printing apparatus comprising application means for applying said first ink, said second ink, and said treatment liquid separately to a printing medium to mix the first ink, the second ink, and the treatment liquid in a liquid state on said printing medium.

35. An ink-jet printing apparatus carrying out printing, using an ink-ejecting portion for ejecting an ink containing a coloring material to a printing medium and a treatment-liquid-ejecting portion for ejecting a treatment liquid for making the coloring material of the ink to be ejected by the ejecting portion insoluble, by ejecting the ink to a printing medium followed by ejecting the treatment liquid, said ink-ejecting portion comprising a first ink-ejecting portion for ejecting a first ink containing a first pigment selected from a self-dispersing pigment having at least one anionic group bonded directly or through another atomic group to the surface of the first pigment and a self-dispersing pigment having at least one cationic group bonded directly or through another atomic group to the surface of the first pigment; and a second ink-ejecting portion for ejecting a second ink containing a second pigment capable of being dispersed in an aqueous medium by a polymer dispersant and at least one dispersant selected from a polymer dispersant having the same polarity as that of the group bonded to the surface of the first pigment and a nonionic polymer dispersant, comprising:

arrangement means for arranging said first ink-ejecting portion, said second ink-ejecting portion, and said treatment-liquid-ejecting portion in a prescribed relative position, and control means for relatively moving the respective ejecting portions to the printing medium, and for having the respective ejecting portions eject said first ink, said second ink, and said treatment liquid respectively so as to mix said first ink, said second ink, and said treatment liquid on the printing medium.

36. An ink-jet printing process including a process of recording images on a printing medium, said process comprising the steps of:

(i) applying an ink on a printing medium by employing an ink-jet recording process; and (ii) applying a treatment liquid capable of reacting with the ink, wherein said ink contains a first pigment and a second pigment dispersed in an aqueous medium, said first pigment being selected from a self-dispersing pigment having at least one anionic group bonded directly or through another atomic group to the surface of the first pigment and a self-dispersing pigment having at least one cationic group bonded directly or through another atomic group to the surface of the first pigment and said second pigment being capable of being dispersed in an aqueous medium by a polymer dispersant, said ink further containing at least one dispersant selected from a polymer dispersant having the same polarity as that of the group bonded to the surface of said first pigment and a nonionic polymer dispersant, and wherein said step (ii) is conducted subsequently to said step (i) or substantially simultaneously with the step (i) so as to bring said ink and said treatment liquid into contact with each other in a liquid state on said printing medium.

37. The ink-jet printing process according to claim 36, further comprising a third step, subsequently to said first step and said second step, of applying said ink to said printing medium so as to mix said ink with the mixed liquid of said ink and said treatment liquid on said printing medium in a liquid state.

38. The ink-jet printing process according to claim 36, wherein said treatment liquid has a penetration rate of 5.0 (ml/m²·msc^{1/2}) or higher as a Ka value measured by Bristow's method.

39. The ink-jet printing process according to any one of claims 36 to 38, wherein said ink has a penetration rate of less than 1 (ml/m²·msc^{1/2}) as a Ka value measured by Bristow's method.

40. The ink-jet printing process according to claim 36, wherein said anionic group is at least one selected from the group consisting of —COOM, —SO₃M, —PO₃HM and —PO₃M₂ (wherein M independently represents hydrogen atom, an alkali metal, ammonium, or an organic ammonium).

41. The ink-jet printing process according to claim 36, wherein said cationic group is at least one selected from the following:

—NH₃⁺, —NR₃⁺, —SO₂NH₂, —SO₂NHCOR,

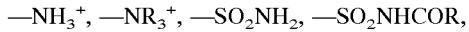

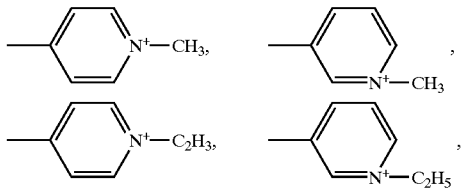

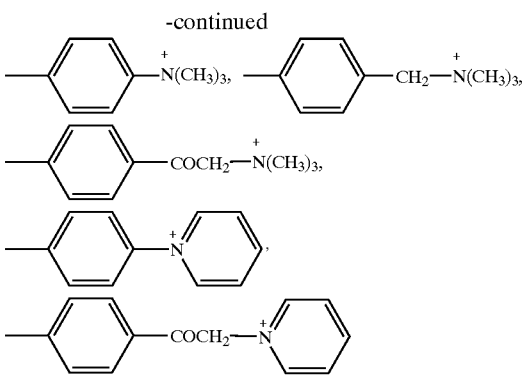

(In the formulas, R independently represents a linear branched alkyl group, a substituted or unsubstituted phenyl group, or a substituted or unsubstituted naphthyl group).

42. The ink-jet painting process according to claim 36, wherein said atomic group is selected from the group consisting of an alkyl having 1 to 12 carbon atoms, a phenyl group which may be substituted, and a naphthyl group which may be substituted.

43. The ink-jet printing process according to claim 36, wherein 80% or more particles of said first pigment has a particle diameter of 0.05 to 0.3 μm.

44. The ink-jet printing process according to claim 36, wherein 80% or more particle of said first pigment has a particle diameter of 0.1 to 0.25 μm.

45. The ink-jet printing process according to claim 36, wherein said second pigment is dispersed by adsorbing a polymer dispersant in the surface thereof.

46. The ink-jet printing process according to claim 36, wherein said polymer dispersant is at least one selected from the group consisting of a sulfonic acid type polymer dispersant and a carboxylic acid type polymer dispersant.

47. The ink-jet printing process according to claim 36, wherein said second pigment contains at least two pigments having different structures.

48. The ink-jet printing process according to claim 36, wherein the ratio of said first pigment to said second pigment is within the range from 5/95 to 97/3.

49. The ink-jet printing process according to claim 36, wherein the ratio of said first pigment to said second pigment is within the range from 10/90 to 95/5.

50. The ink-jet printing process according to claim 36, wherein the ratio of said first pigment to said second pigment is within the range from 9/1 to 4/6.

51. The ink-jet printing process according to claim 36, wherein said first pigment is contained at a content higher than that of said second pigment.

52. The ink-jet printing process according to claim 36, wherein at least one of said first pigment and said second pigment is a carbon black.

53. The ink-jet printing process according to claim 36, wherein said ink further contains a dye with the same polarity as that of the group bonded to the surface of said first pigment.

54. The ink-jet printing process according to claim 53, wherein the polarity of the group bonded to the surface of said first pigment is anionic, and said dye is an anionic dye.

55. The ink-jet printing process according to claim 54, wherein said anionic dye is at least one selected from the group consisting an acidic dye, a direct dye, and a reactive dye.

56. The ink-jet printing process according to claim 54, wherein said anionic dye has a skeletal structure selected from a disazo skeletal structure and a trisazo skeletal structure.

57. The ink-jet printing process according to claim 36, wherein said treatment liquid contains a compound having at least one group with the polarity opposite to that of the group bonded to the surface of said first pigment.

58. The ink-jet printing process according to claim 36, wherein said treatment liquid contains a first compound having one group with the polarity opposite to that of the group bonded to the surface of said first pigment and a second compound having a plurality of groups with the polarity opposite to that of the group bonded to the surface of said first pigment.

59. The ink-jet printing process according to claim 58, wherein said first compound is benzalkonium chloride and said second compound is polyallylamine.

60. The ink-jet printing process according to claim 58 or 59, wherein the ratio of said first compound and said second compound in said treatment liquid is substantially optimized for the composition of said ink.

61. An ink-jet printing process comprising the steps of applying a first ink, a second ink, and a treatment liquid reactable with at least one of said first and second ink in such a manner that the respective first ink, second ink and treatment liquid are brought into contact with on the surface of a printing medium in a liquid state, wherein said first ink contains a first pigment selected from a self-dispersing pigment having at least one anionic group bonded directly or through another atomic group to the surface of said first pigment and a self-dispersing pigment having at least one cationic group bonded directly or through another atomic group to the surface of the first pigment, said second ink contains a second pigment capable of being dispersed in an aqueous medium by a polymer dispersant and at least one dispersant selected from a polymer dispersant having the same polarity as that of the group bonded to the surface of the self-dispersing pigment and a nonionic polymer dispersant, said treatment liquid containing a compound having the opposed polarity to that of the group bonded to the surface of the self-dispersing pigment, and said treatment liquid being applied after applying at least one of said first ink and said second ink to a printing medium.

62. The ink-jet printing process according to claim 61, wherein said treatment liquid is applied to a printing medium after application of said first ink and said second ink.

63. The ink-jet printing process according to claim 61, wherein either one of said first ink and said second ink is applied to a printing medium followed by applying said treatment liquid and applying the other ink.

* * * * *

UNITED STATES PATENT AND TRADEMARK OFFICE
CERTIFICATE OF CORRECTION

PATENT NO. : 6,435,677 B1
DATED : August 20, 2002
INVENTOR(S) : Noribumi Koitabashi et al.

It is certified that error appears in the above-identified patent and that said Letters Patent is hereby corrected as shown below:

Column 1,
Line 39, "is" should be deleted; and
Line 52, "Is" should read -- is --.

Column 2,
Line 1, "In" should read -- in --;
Line 4, "so called" should read -- so-called --; and
Line 5, "(so called" should read -- (so-called --.

Column 5,
Line 51, "compare" should read -- compared --.

Column 14,
Line 44, "hating" should read -- having --; and
Line 45, "Into" should read -- into --.

Column 15,
Line 3, "a" ($2^{nd}$ occurrence) should read -- an --;
Line 26, "(ml/($m^2$ · msec½)" should read -- (ml/($m^2$ · msec^½) --; and
Line 32, "than 8" should read -- than 5 --.

Column 16,
Line 2, "ununiformity" should read -- non-uniformity --; and
Line 67, "Is" should read -- is --.

Column 26,
Line 37, "column" should read -- column. --.

Column 28,
Line 29, "Is" should read -- is --.

Column 31,
Line 20, "since." should read -- since --;
Line 46, "used" should read -- used. --; and
Line 49, "follow." should read -- follows. --.

Column 32,
Line 38, "20 pl, --" should read -- 20 pl. --.

Column 33,
Line 44, "irk" should read -- ink --.

UNITED STATES PATENT AND TRADEMARK OFFICE
CERTIFICATE OF CORRECTION

PATENT NO. : 6,435,677 B1
DATED : August 20, 2002
INVENTOR(S) : Noribumi Koitabashi et al.

It is certified that error appears in the above-identified patent and that said Letters Patent is hereby corrected as shown below:

Column 34,
Line 54, "self" should read -- self- --.

Column 35,
Line 47, "comprising" should read -- comprising: --.

Column 36,
Lines 34 and 37, "has" should read -- have --; and
Line 59, "where n" should read -- wherein --.

Column 37,
Line 6, "from" should be deleted.

Column 39,
Line 35, "subsequently" should read -- subsequent --.

Column 40,
Line 19, "painting" should read -- printing --;
Lines 25 and 28, "has" should read -- have --;
Line 28, "particle" should read -- particles --;
Line 62, "consisting" should read -- consisting of --.

Column 41,
Line 23, "on" should be deleted.

Column 42,
Line 12, "opposed" should read -- opposite --.

Signed and Sealed this

Tenth Day of June, 2003

JAMES E. ROGAN
*Director of the United States Patent and Trademark Office*